United States Patent
Cobb et al.

(10) Patent No.: US 10,501,209 B2
(45) Date of Patent: Dec. 10, 2019

(54) METROLOGY SYSTEM FOR POSITIONING ASSEMBLIES

(71) Applicant: The Boeing Company, Chicago, IL (US)

(72) Inventors: James M. Cobb, Burien, WA (US); Clayton Lynn Munk, Maple Valley, WA (US); Dan Dresskell Day, Seattle, WA (US); Eric M. Reid, Kenmore, WA (US); Matthew Ray DesJardien, Kenmore, WA (US); Steven A. Best, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/012,577

(22) Filed: Jun. 19, 2018

(65) Prior Publication Data

US 2018/0312277 A1 Nov. 1, 2018

Related U.S. Application Data

(63) Continuation of application No. 14/559,034, filed on Dec. 3, 2014, now Pat. No. 10,000,298.

(Continued)

(51) Int. Cl.
*G06F 19/00* (2018.01)
*B64F 5/10* (2017.01)
(Continued)

(52) U.S. Cl.
CPC ............... *B64F 5/10* (2017.01); *G05B 19/19* (2013.01); *G05B 19/402* (2013.01); *B23Q 1/035* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,006,650 A | 2/1977 | Elmer | |
| 4,108,566 A | 8/1978 | Jones | |
| (Continued) | | | |

FOREIGN PATENT DOCUMENTS

| | | |
|---|---|---|
| CA | 2497249 A1 | 8/2006 |
| CA | 2553747 C | 7/2013 |
| (Continued) | | |

OTHER PUBLICATIONS

Spishak et al., "Magnet Sensing Hole Driller and Method Therefor," U.S. Appl. No. 13/931,165, filed Jun. 28, 2013, 33 pages.

(Continued)

*Primary Examiner* — Kidest Bahta
(74) *Attorney, Agent, or Firm* — Yee & Associates, P.C.

(57) ABSTRACT

A method and apparatus for maintaining a selected configuration for a structure. Metrology data for a support system is received while the support system holds the structure. A determination is made as to whether a current configuration of the structure is within selected tolerances of the selected configuration for the structure based on the metrology data. The support system is moved to move the structure held by the support system into the selected configuration in response to a determination that the current configuration of the structure is not within the selected tolerances of the selected configuration for the structure.

17 Claims, 15 Drawing Sheets

Related U.S. Application Data

(60) Provisional application No. 61/986,776, filed on Apr. 30, 2014.

(51) Int. Cl.

| | | |
|---|---|---|
| *G05B 19/19* | (2006.01) | |
| *G05B 19/402* | (2006.01) | |
| *B23Q 1/03* | (2006.01) | |
| *B23Q 1/62* | (2006.01) | |

(52) U.S. Cl.
CPC ...... *B23Q 1/621* (2013.01); *G05B 2219/45055* (2013.01); *Y02P 90/86* (2015.11)

(56) References Cited

U.S. PATENT DOCUMENTS

| | | |
|---|---|---|
| 4,148,401 A | 4/1979 | Kautetzky |
| 4,445,588 A | 5/1984 | Truninger |
| 4,477,216 A | 10/1984 | Van De Motter et al. |
| 4,483,080 A | 11/1984 | Knoll |
| 4,599,018 A | 7/1986 | Woods |
| 4,674,949 A | 6/1987 | Kroczynski |
| 4,710,086 A | 12/1987 | Naaktgeboren et al. |
| 4,781,517 A | 11/1988 | Pearce et al. |
| 4,850,763 A | 7/1989 | Jack et al. |
| 4,885,836 A | 12/1989 | Bonomi et al. |
| 4,940,382 A | 7/1990 | Castelain et al. |
| 4,995,146 A | 2/1991 | Woods |
| 4,998,206 A * | 3/1991 | Jones .............. G05B 19/4097 |
| | | 700/145 |
| 5,022,542 A | 6/1991 | Beier |
| 5,150,506 A | 9/1992 | Kotake et al. |
| 5,203,855 A | 4/1993 | Givler et al. |
| 5,210,935 A | 5/1993 | Givler |
| 5,213,454 A | 5/1993 | Givler et al. |
| 5,216,819 A | 6/1993 | Givler |
| 5,231,747 A | 8/1993 | Clark et al. |
| 5,231,754 A | 8/1993 | Givler |
| 5,259,104 A | 11/1993 | Givler |
| 5,263,236 A | 11/1993 | Givler |
| 5,326,201 A | 7/1994 | King |
| 5,351,626 A | 10/1994 | Yanagisawa |
| 5,390,128 A | 2/1995 | Ryan et al. |
| 5,407,415 A | 4/1995 | Spishak |
| 5,419,268 A | 5/1995 | Fyler et al. |
| 5,468,099 A | 11/1995 | Wheetley et al. |
| 5,524,180 A | 6/1996 | Wang et al. |
| 5,526,203 A | 6/1996 | Mohajerani et al. |
| 5,653,351 A | 8/1997 | Grout et al. |
| 5,657,429 A | 8/1997 | Wang et al. |
| 5,709,026 A | 1/1998 | Veselaski et al. |
| 5,715,729 A | 2/1998 | Toyama et al. |
| 5,848,859 A | 12/1998 | Clark et al. |
| 5,910,894 A | 6/1999 | Pryor |
| 5,920,394 A | 7/1999 | Gelbart et al. |
| 6,098,260 A | 8/2000 | Sarh |
| 6,210,084 B1 | 4/2001 | Banks et al. |
| 6,230,382 B1 | 5/2001 | Cunningham et al. |
| 6,625,512 B1 * | 9/2003 | Goodwin ............ G03F 7/70625 |
| | | 257/E21.525 |
| 6,779,272 B2 | 8/2004 | Day et al. |
| 6,843,328 B2 | 1/2005 | Boyl-Davis et al. |
| 6,862,912 B2 | 3/2005 | Olsson |
| 6,871,524 B2 | 3/2005 | Olsson |
| 6,926,094 B2 | 8/2005 | Amtson et al. |
| 7,168,898 B2 | 1/2007 | Hamann |
| 7,249,943 B2 | 7/2007 | Benson et al. |
| 7,273,333 B2 | 9/2007 | Buttrick et al. |
| 7,406,758 B2 | 8/2008 | Jones et al. |
| 7,614,154 B2 | 11/2009 | Cobb |
| 8,005,563 B2 | 8/2011 | Cobb et al. |
| 8,299,118 B2 | 10/2012 | Chang et al. |
| 8,539,658 B2 | 9/2013 | Munk |
| 8,606,388 B2 | 12/2013 | Cobb et al. |
| 8,620,470 B2 | 12/2013 | Cobb et al. |
| 8,661,684 B1 | 3/2014 | Boyd et al. |
| 8,790,050 B2 | 7/2014 | Marguet et al. |
| 9,090,357 B2 | 7/2015 | Oberoi et al. |
| 9,205,933 B2 | 12/2015 | Oberoi et al. |
| 9,299,118 B1 | 3/2016 | McGraw |
| 2002/0066192 A1 | 6/2002 | Cunningham et al. |
| 2002/0136612 A1 | 9/2002 | Martinez et al. |
| 2003/0043964 A1 | 3/2003 | Sorenson |
| 2005/0036879 A1 | 2/2005 | Jhaveri et al. |
| 2005/0049126 A1 | 3/2005 | Everson et al. |
| 2005/0055110 A1 * | 3/2005 | Tuszynski .............. G05B 17/02 |
| | | 700/31 |
| 2005/0172470 A1 * | 8/2005 | Cobb ................ G05B 19/41805 |
| | | 29/407.1 |
| 2005/0223549 A1 | 10/2005 | Braun |
| 2006/0108470 A1 | 5/2006 | McCrary et al. |
| 2006/0118235 A1 | 6/2006 | Kum et al. |
| 2007/0005525 A1 * | 1/2007 | Collette, III ......... G05B 13/027 |
| | | 706/15 |
| 2007/0029877 A1 | 2/2007 | Longley |
| 2007/0180674 A1 | 8/2007 | Morden et al. |
| 2008/0077276 A1 | 3/2008 | Sanjuan et al. |
| 2008/0155807 A1 | 7/2008 | Toh et al. |
| 2008/0205763 A1 | 8/2008 | Marsh et al. |
| 2009/0112349 A1 | 4/2009 | Cobb et al. |
| 2009/0297316 A1 | 12/2009 | Wells et al. |
| 2010/0025349 A1 | 2/2010 | Khoshnevis |
| 2010/0180711 A1 | 7/2010 | Kilibarda et al. |
| 2010/0204817 A1 | 8/2010 | Fujita |
| 2010/0217437 A1 | 8/2010 | Sarh et al. |
| 2011/0010007 A1 | 1/2011 | Sarh et al. |
| 2011/0054694 A1 | 3/2011 | Munk |
| 2011/0132548 A1 | 6/2011 | De Mattia |
| 2011/0178727 A1 | 7/2011 | Hafenrichter et al. |
| 2011/0214586 A1 | 9/2011 | Wessel et al. |
| 2012/0014759 A1 | 1/2012 | Sarh et al. |
| 2012/0210802 A1 | 8/2012 | Sarh et al. |
| 2013/0014368 A1 | 1/2013 | Woods et al. |
| 2013/0018525 A1 | 1/2013 | Jang et al. |
| 2013/0145850 A1 | 6/2013 | Lute, Jr. et al. |
| 2013/0152397 A1 | 6/2013 | Oberoi et al. |
| 2013/0158697 A1 | 6/2013 | Stone et al. |
| 2013/0226340 A1 | 8/2013 | Buchstab |
| 2013/0289766 A1 | 10/2013 | Hafenrichter et al. |
| 2014/0115860 A1 | 5/2014 | Sarh et al. |
| 2014/0157588 A1 | 6/2014 | Boyd et al. |
| 2014/0277717 A1 | 9/2014 | Jung et al. |
| 2014/0305217 A1 | 10/2014 | Tapia et al. |
| 2014/0340509 A1 | 11/2014 | Fairbairn |
| 2015/0023748 A1 | 1/2015 | Carberry et al. |
| 2015/0135535 A1 | 5/2015 | Hallam et al. |
| 2015/0266147 A1 | 9/2015 | Reid et al. |
| 2016/0067792 A1 | 3/2016 | Cardon et al. |
| 2016/0128656 A1 | 5/2016 | Gregerson et al. |
| 2016/0334301 A1 | 11/2016 | Hafenrichter et al. |
| 2017/0197253 A1 | 7/2017 | Cardon et al. |

FOREIGN PATENT DOCUMENTS

| | | |
|---|---|---|
| DE | 102008041190 A1 | 3/2010 |
| EP | 1227316 A2 | 7/2002 |
| EP | 1884453 A2 | 2/2008 |
| EP | 2108515 A1 | 10/2009 |
| EP | 2221151 A2 | 8/2010 |
| EP | 2604521 A2 | 6/2013 |
| EP | 2631041 A2 | 8/2013 |
| EP | 2792431 A1 | 10/2014 |
| GB | 2095215 A | 9/1982 |
| GB | 2329138 A | 3/1993 |
| GB | 2473100 A | 3/2011 |
| GB | 2498977 A | 8/2013 |
| JP | 2000095197 A | 4/2000 |
| JP | 2013123794 A | 6/2013 |
| KR | 100999190 B1 | 12/2010 |
| WO | WO2010018340 A2 | 2/2010 |

(56) References Cited

FOREIGN PATENT DOCUMENTS

WO    WO2013117971 A1    8/2013
WO    WO2014193602 A2    12/2014

OTHER PUBLICATIONS

Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Day et al., "Crawler Robot and Supporting Platform," U.S. Appl. No. 14/558,850, filed Dec. 3, 2014, 78 pages.
Desjardien et al., "Apparatus, System, and Method for Supporting a Wing Assembly," U.S. Appl. No. 14/558,834, filed Dec. 3, 2014, 88 pages.
Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Desjardien et al., "Mobile Automated Overhead Assembly Tool for Aircraft Structures," U.S. Appl. No. 14/558,899, filed Dec. 3, 2014, 100 pages.
Extended European Search Report, dated Sep. 22, 2015, regarding Application No. EP14196571.5, 8 pages.
Partial European Search Report, dated Sep. 30, 2015, regarding Application No. EP14196480.9, 6 pages.
Extended European Search Report, dated Oct. 2, 2015, regarding Application No. EP14196553.3, 7 pages.
Extended European Search Report, dated Jan. 27, 2016, regarding Application No. EP14196480.9, 10 pages.
Office Action, dated Mar. 4, 2016, regarding U.S. Appl. No. 14/558,850, 24 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Office Action, dated May 12, 2016, regarding U.S. Appl. No. 14/558,899, 35 pages.
Office Action, dated May 12, 2016, regarding U.S. Appl. No. 14/558,859, 27 pages.
Final Office Action, dated Aug. 2, 2016, regarding U.S. Appl. No. 14/558,850, 33 pages.
Notice of Allowance, dated Jul. 7, 2016, regarding U.S. Appl. No. 14/558,859, 29 pages.
Office Action, dated Nov. 10, 2016, regarding U.S. Appl. No. 14/558,850, 23 pages.
Final Office Action, dated Nov. 17, 2016, regarding U.S. Appl. No. 14/558,899, 36 pages.
Canadian Intellectual Property Office Search Report, dated Feb. 24, 2017, regarding Application No. 2,883,614, 17 pages.
Canadian Intellectual Property Office Search Report, dated Feb. 23, 2017, regarding Application No. 2,896,059, 11 pages.
Canadian Intellectual Property Office Office Action, dated Mar. 1, 2017, regarding Application No. 2,882,420, 7 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Notice of Allowance, dated Apr. 24, 2017, regarding U.S. Appl. No. 14/558,850, 11 pages.
Notice of Allowance, dated Feb. 27, 2017, regarding U.S. Appl. No. 14/558,899, 13 pages.
Office Action, dated Jun. 13, 2017, regarding U.S. Appl. No. 14/558,834, 39 pages.
Final Office Action, dated Oct. 3, 2017, regarding U.S. Appl. No. 14/558,834, 12 pages.
Office Action, dated Nov. 29, 2017, regarding U.S. Appl. No. 14/558,853, 78 pages.
Canadian Intellectual Propoerty Office Examination Report, dated Dec. 14, 2017, regarding Application No. 2,882,446, 16 pages.
Canadian Intellectual Property Office Office Action, dated Feb. 15, 2018, regarding Application No. 2,883,614, 20 pages.
Office Action, dated May 3, 2017, regarding U.S. Appl. No. 14/559,034, 55 pages.
Final Office Action, dated Oct. 2, 2017, regarding U.S. Appl. No. 14/559,034, 21 pages.
State Intellectual Property Office of PRC Notification of First Office Action and English translation, dated Apr. 24, 2018, regarding Application No. 2015102135559, 11 pages.
State Intellectual Property Office of PRC Notification of Second Office Action with English Translation, dated Oct. 18, 2018, regarding Application No. 2015102135559, 10 pages.
European Patent Office Communication Report, dated Nov. 20, 2018, regarding Application No. 14196494.0, 4 pages.
European Patent Office Communication Report, dated Nov. 19, 2018, regarding Application No. 14196553.3, 7 pages.
Japanese Notice of Reasons for Rejection and English Translation, dated Jan. 29, 2019, regarding Application No. 2015052833, 8 pages.

\* cited by examiner

FIG. 14
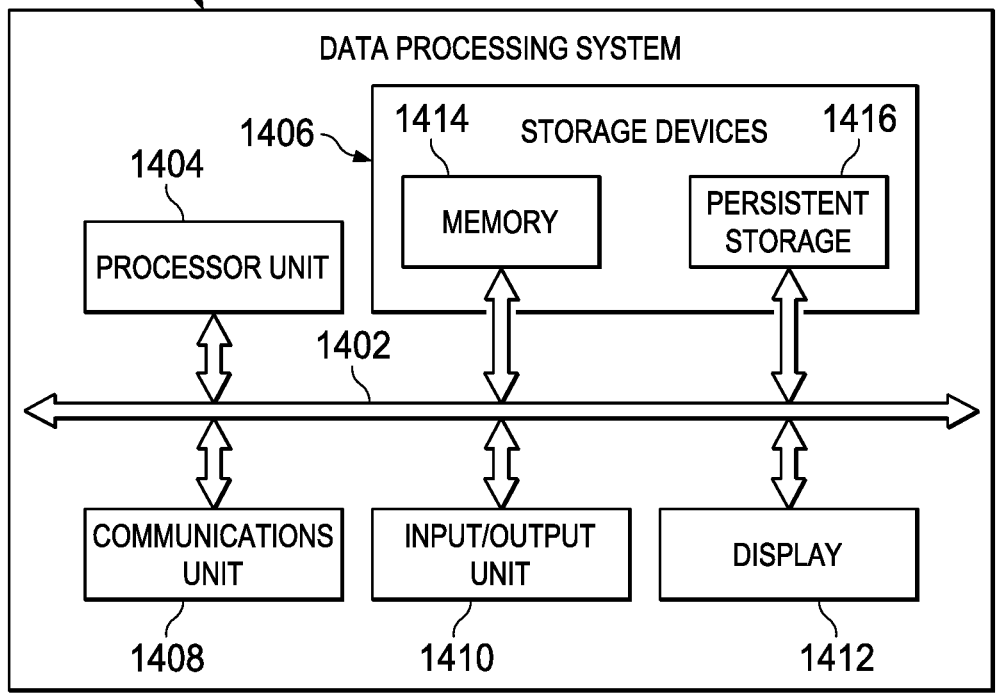
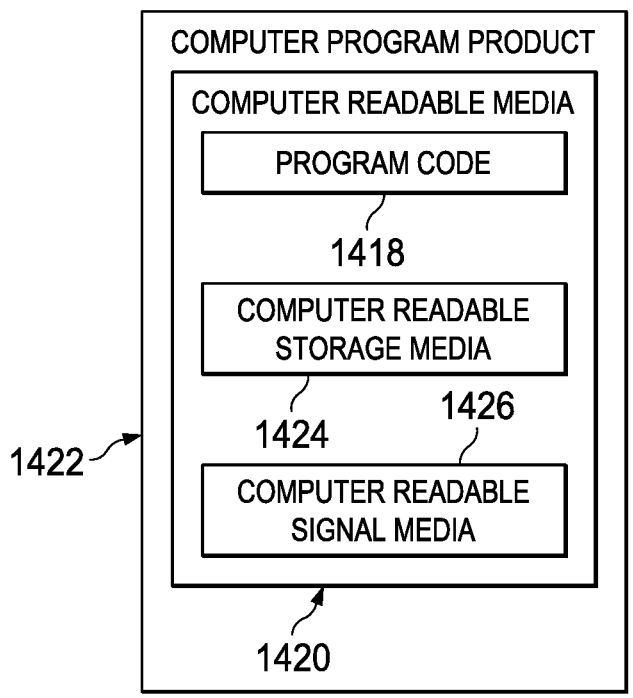

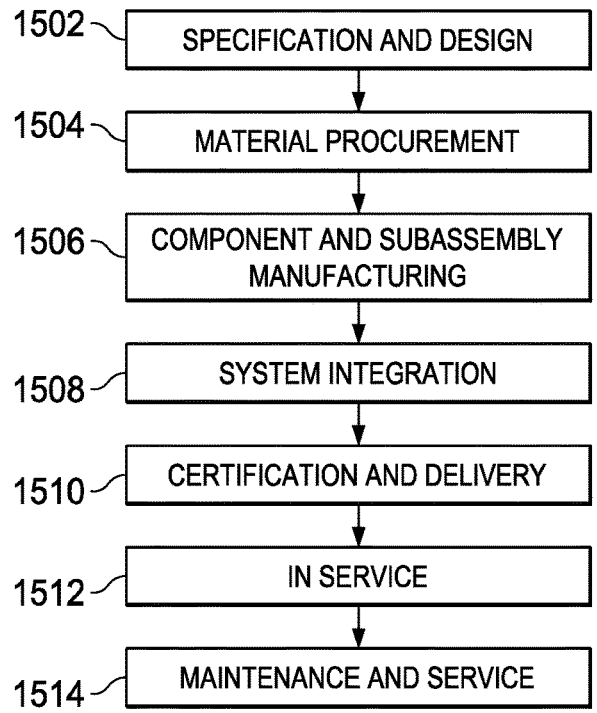
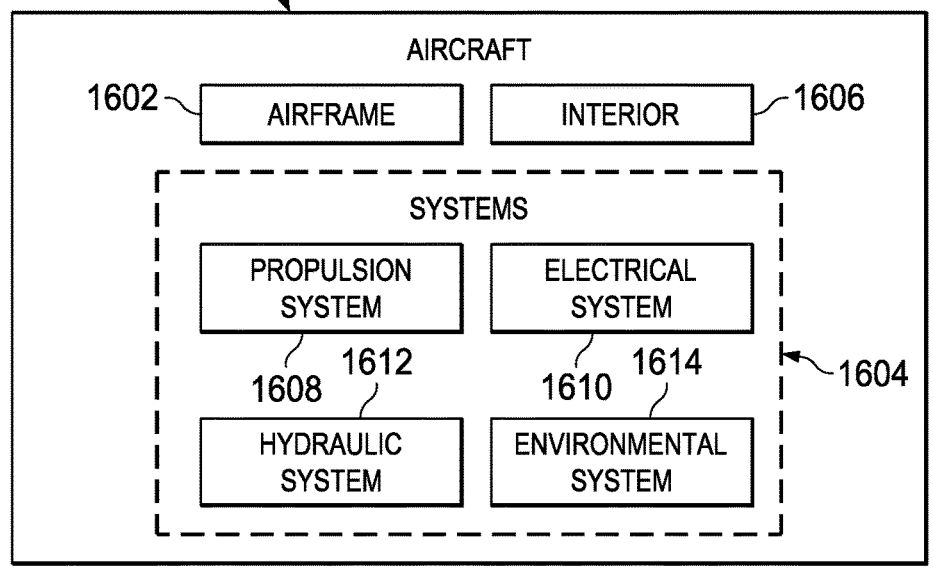

METROLOGY SYSTEM FOR POSITIONING ASSEMBLIES

RELATED PROVISIONAL APPLICATION

This application is a continuation of U.S. patent application Ser. No. 14/559,034, filed Dec. 3, 2014, now U.S. Pat. No. 10,000,298, which claims the benefit of U.S. Provisional Patent Application Ser. No. 61/986,776, filed Apr. 30, 2014, and entitled "Metrology System for Positioning Assemblies."

CROSS-REFERENCE TO RELATED APPLICATIONS

This application is related to the following patent applications: entitled "Mobile Automated Overhead Assembly Tool for Aircraft Structures," Ser. No. 14/558,899, now U.S. Pat. No. 9,708,079; entitled "Mobile Automated Assembly Tool for Aircraft Structures," Ser. No. 14/558,859, now U.S. Pat. No. 9,486,917; entitled "Crawler Robot and Supporting Platform," Ser. No. 14/558,850, now U.S. Pat. No. 9,776,330; entitled "Flexible Manufacturing System for Aircraft Structures," Ser. No. 14/558,867; entitled "System and Method for Positioning an Automated Assembly Tool Relative to a Structure," Ser. No. 14/558,853; and entitled "Apparatus, System, and Method for Supporting a Wing Assembly," Ser. No. 14/558,834, each incorporated herein by reference in its entirety.

BACKGROUND INFORMATION

1. Field

The present disclosure relates generally to the manufacturing of structures and, in particular, to the manufacturing of aircraft structures. Still more particularly, the present disclosure relates to a method and apparatus for maintaining a selected configuration of a structure during the manufacturing of a completed aircraft structure using a drivable support system.

2. Background

Manufacturing aircraft structures may be a complex and time-consuming process. For example, the manufacturing of a wing, fuselage, or some other type of aircraft structure may require the assembly of hundreds, thousands, or tens of thousands of parts. During the assembly of an aircraft structure, one or more components used to form the aircraft structure may need to be held in certain positions relative to each other such that operations may be performed on these components.

As one example, the front spar assembly and rear spar assembly for a wing may need to be held in certain positions relative to each other, while various operations are performed to assemble the wing. These operations may be performed simultaneously, at different times, or both. The operations performed may include, for example, without limitation, any combination of drilling, countersinking, fastening, coupling, sealing, coating, inspecting, painting, or other suitable types of operations.

Some currently available methods for assembling an aircraft structure use rigid supports to hold components in certain positions during the assembly process. In some cases, these rigid supports, which are sometimes referred to as tools, may be fastened to the factory floor to form an assembly line for manufacturing the aircraft structure. However, these supports may limit future expansion of the assembly line because they are typically permanently fastened to the factory floor.

Further, these supports may be unable to accommodate the manufacturing of aircraft structures of different shapes and sizes. Once installed, the rigid supports may not allow the flexibility needed to account for aircraft design changes, changes in manufacturing locations, changes in aircraft production rate, or other types of changes. Consequently, using these types of rigid supports for the assembly of aircraft structures may cause the assembly process to be more time-consuming and expensive than desired. Additionally, the rigid supports may require more maintenance than desired over time. Therefore, it would be desirable to have a method and apparatus that take into account at least some of the issues discussed above, as well as other possible issues.

SUMMARY

In one illustrative embodiment, a method for maintaining a selected configuration for a structure during a manufacturing process for forming a product using the structure is provided. Metrology data for a support system is received. The support system holds the structure during the manufacturing process. A determination is made as to whether a current configuration of the structure is within selected tolerances of the selected configuration for the structure based on the metrology data. The support system is reconfigured to move the structure into the selected configuration in response to a determination that the current configuration of the structure is not within the selected tolerances of the selected configuration for the structure.

In another illustrative embodiment, an apparatus comprises a support system, a metrology system, and a controller. The support system is configured to hold a structure during a manufacturing process for forming a product using the structure. The metrology system is configured to generate metrology data. The support system holds the structure during the manufacturing process. The controller is configured to receive the metrology data. The controller is further configured to determine whether a current configuration of the structure is within selected tolerances of a selected configuration for the structure based on the metrology data. The controller is still further configured to generate commands for reconfiguring the support system to move the structure into the selected configuration in response to a determination that the current configuration of the structure is not within the selected tolerances of the selected configuration for the structure.

In still another illustrative embodiment, an apparatus comprises a support system and a controller. The support system is configured to hold a structure during a manufacturing process for forming a product using the structure. The controller is configured to receive metrology data generated for the support system while the support system holds the structure during the manufacturing process. The controller is further configured to determine whether a current configuration of the structure is within selected tolerances of a selected configuration for the structure based on the metrology data. The controller is still further configured to generate commands for reconfiguring the support system to move the structure into the selected configuration in response to a determination that the current configuration of the structure is not within the selected tolerances of the selected configuration for the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a data processing system in the form of a block diagram in accordance with an illustrative embodiment;

FIG. 15 is an illustration of an aircraft manufacturing and service method in the form of a block diagram in accordance with an illustrative embodiment; and FIG. 16 is an illustration of an aircraft in the form of a block diagram in which an illustrative embodiment may be implemented.

DETAILED DESCRIPTION

Figure 1:
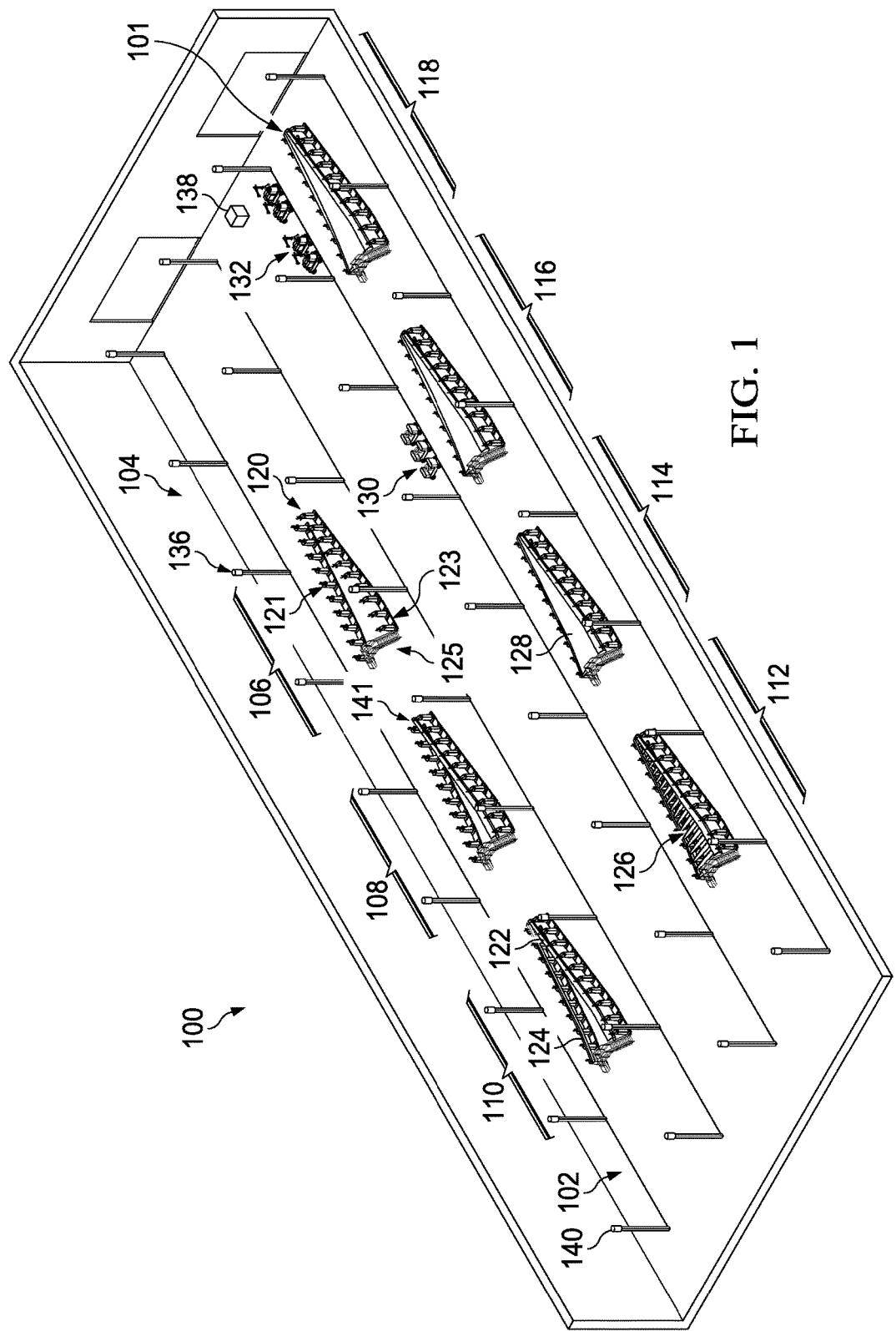
FIG. 1 is an illustration of an isometric view of a manufacturing environment in accordance with an illustrative embodiment.

The illustrative embodiments recognize and take into account different considerations. For example, the illustrative embodiments recognize and take into account that it may be desirable to use a support system that includes supports that are movable relative to a factory floor to support the components used in the assembly of aircraft structures. This support system may be used to move the components to different locations within a manufacturing environment. These locations may be, for example, work cells. Using a support system may reduce the overall time, expense, and effort needed to manufacture an aircraft structure.

Additionally, the illustrative embodiments recognize and take into account that it may be desirable to have a support system that includes a movable platform onto which supports may be removably fastened. In this manner, the support system may allow an assembly line to be expanded or reduced in size as needed. Further, this type of support system may provide the flexibility needed to account for aircraft design changes, changes in manufacturing locations, changes in aircraft production rate, or other types of changes.

However, the illustrative embodiments also recognize and take into account that moving the support system may cause the positions of components being held by the support system to deviate from desired positions for these components. In some cases, the performance of certain operations during the manufacturing process may cause undesired movement of the components supported by the support system.

As one example, a support system may be used to hold a wing assembly for forming a wing for an aircraft in a selected configuration during manufacturing of the wing in a factory. The illustrative embodiments recognize and take into account that it may be desirable to have a support system capable of maintaining a selected configuration of the wing assembly during manufacturing to account for any deviations from the selected configuration during movement of the support system between work cells and deviations from the selected configuration based on increased gravitational forces and loads applied to the wing assembly during manufacturing.

Thus, the illustrative embodiments recognize and take into account that it may be desirable to have a system capable of ensuring that the components supported by the support system are held in a selected configuration during a manufacturing process. More specifically, the illustrative embodiments provide a method, apparatus, and system for reconfiguring a support system to ensure that a structure supported by the support system is held in a selected configuration during a manufacturing process. In one illustrative example, metrology data for the support system is used to determine whether a current configuration of the structure being supported by the support system is within selected tolerances of a selected configuration for the structure. In response to a determination that the current configuration is not within selected tolerances of the selected configuration, the support system is reconfigured to move the structure into the selected configuration. An example of one manner in which this process may be performed is described in the figures below.

Referring now to the figures and, in particular, with reference now to FIG. 1, an illustration of an isometric view of a manufacturing environment is depicted in accordance with an illustrative embodiment. In this illustrative example, manufacturing environment 100 is an example of an environment in which an aircraft structure may be manufactured. As one example, wing 101 may be assembled in manufacturing environment 100.

Floor 102 of manufacturing environment 100 is used to define different locations for performing different operations in manufacturing environment 100. In particular, plurality of work cells 104 is defined relative to floor 102. As used herein, a "work cell" is a location or area within which one or more operations are performed. Plurality of work cells 104 includes work cells 106, 108, 110, 112, 114, 116, and 118. A different stage in the manufacturing of wing 101 is performed at each of work cells 106, 108, 110, 112, 114, 116, and 118.

Support system 120 is used to support the components used in the assembly of wing 101. Support system 120 may be moved from one work cell in plurality of work cells 104 to the next during the assembly of wing 101. Support system 120 may be flexible, movable, and reconfigurable. For example, support system 120 may take the form of a drivable support system in this illustrative example.

As depicted, support system 120 includes plurality of supports 121, platform structure 123, and bridge system 125. Plurality of supports 121 and bridge system 125 are associated with platform structure 123.

As used herein, when one component is "associated" with another component, the association is a physical association in the depicted examples. For example, a first component, such as one of plurality of supports 121, may be considered to be associated with a second component, such as platform structure 123, by being at least one of secured to the second component, bonded to the second component, mounted to the second component, welded to the second component, fastened to the second component, coupled to the second component, or connected to the second component in some other suitable manner. The first component also may be connected to the second component using a third component. Further, the first component may be considered to be associated with the second component by being formed as part of the second component, an extension of the second component, or both.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As support system 120 moves through plurality of work cells 104, support system 120 supports a structure for wing 101 at various stages during the manufacturing process. This structure changes as support system 120 moves through plurality of work cells 104. This structure may include one or more parts, sub-assemblies, or assemblies.

For example, during the initial stage of assembling wing 101, support system 120 is moved into work cell 106 and configured based on specified requirements. Moving support system 120 into work cell 106 may include driving plurality of supports 121 into work cell 106. Plurality of supports 121 may also be referred to as a plurality of drivable supports in other illustrative examples.

As used herein, "driving" a support means moving the entire support and all components that make up the support together. In this manner, driving one or more of plurality of supports 121 may include moving the entirety of these one or more of plurality of supports 121 together.

In one illustrative example, each of plurality of supports 121 may be configured in a manner to receive front spar assembly 122 for wing 101. In other words, elements of each of plurality of supports 121 used to hold front spar assembly 122 may be configured to receive front spar assembly 122.

Support system 120 is moved into work cell 108 for the next stage of manufacturing. While support system 120 is in work cell 108, front spar assembly 122 is loaded onto support system 120. Front spar assembly 122 is the structure supported by support system 120 at this stage of manufacturing.

Support system 120 is then moved into work cell 110, where rear spar assembly 124 is loaded onto support system 120. In this manner, at this stage of manufacturing, the structure supported by support system 120 includes front spar assembly 122 and rear spar assembly 124. Support system 120 is then moved into work cell 112. Ribs 126 are attached to front spar assembly 122 and rear spar assembly 124 in work cell 112, while support system 120 supports front spar assembly 122 and rear spar assembly 124. At this stage of manufacturing, the structure supported by support system 120 includes front spar assembly 122, rear spar assembly 124, and ribs 126.

As depicted, skin panel 128 and another skin panel (not shown in this view) are attached to front spar assembly 122, rear spar assembly 124, and ribs 126 in work cell 114 to form wing 101. Thus, the structure supported by support system 120 within work cell 114 includes front spar assembly 122, rear spar assembly 124, ribs 126, skin panel 128, and the other skin panel not shown.

Support system 120 and the structure supported by support system 120 may be moved from work cell 114 to work cell 116. First plurality of tools 130 is used to perform selected operations within work cell 116. Support system 120 and the structure supported by support system 120 may then be moved from work cell 116 to work cell 118. Second plurality of tools 132 is used to perform selected operations within work cell 118 to complete the manufacturing of wing 101.

As support system 120 is moved to the different work cells in plurality of work cells 104, the structure supported by support system 120 may need to be held in a selected configuration. The selected configuration may be a desired configuration based on any number of manufacturing requirements, assembly specifications, safety requirements, other parameters, or combination thereof.

In some cases, the movement of support system 120 may cause the structure to move out of this selected configuration. In other cases, the gravitational forces and loads applied to the structure during the manufacturing process may cause the structure to move out of the selected configuration. For example, the additional weight caused by additional components being installed on the structure may cause at least a portion of the structure to bend or flex in an undesired manner. Metrology system 136 and controller 138 are used to ensure that the structure supported by support system 120 is held in the selected configuration throughout the manufacturing process.

In this illustrative example, metrology system 136 includes plurality of transmitters 140 and plurality of target systems 141. As depicted, each of plurality of transmitters 140 is elevated above floor 102. Each of plurality of transmitters 140 emits two optical signals in this illustrative example. The optical signals may be laser beams. Each target system in plurality of target systems 141 includes at least three targets. These targets may take the form of, for example, without limitation, active sensors, passive sensors, or some combination thereof.

Metrology system 136 generates metrology data that is used to determine whether a configuration of the structure being supported by support system 120 during a given stage of the manufacturing process is within selected tolerances of the selected configuration for the structure for that given stage of the manufacturing process. In this illustrative example, controller 138 receives the metrology data wirelessly from plurality of transmitters 140, plurality of target systems 141, or both. Controller 138 determines whether the configuration of the structure is not within selected tolerances of the selected configuration.

If controller 138 determines that the configuration of the structure is not within selected tolerances of the selected configuration, controller 138 generates commands that are sent wirelessly to support system 120. For example, controller 138 may send commands to one or more of plurality of supports 121 to reconfigure one or more supports to move the structure supported by support system 120 into the selected configuration.

Figure 2:
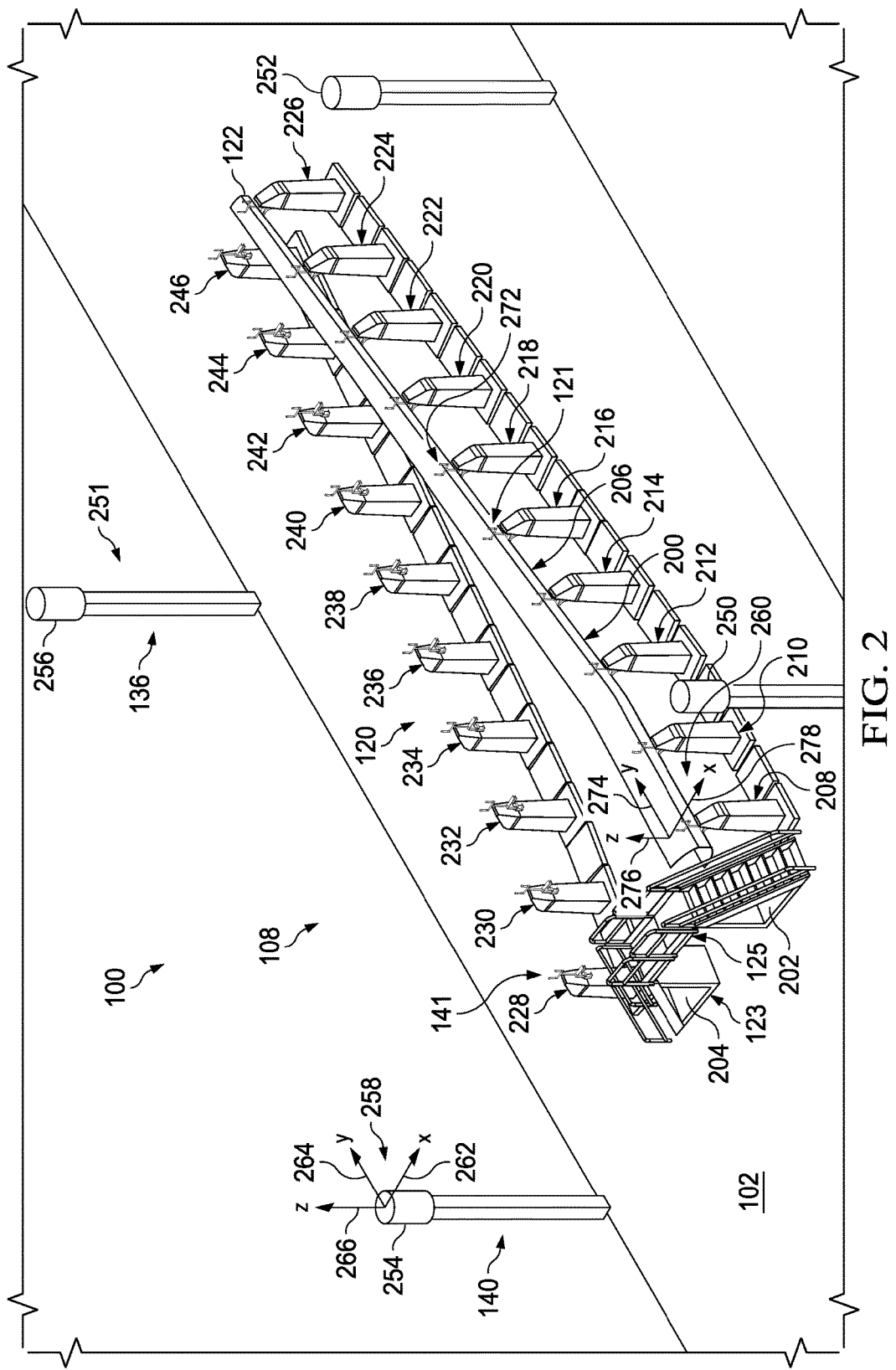
FIG. 2 is an illustration of an isometric view of a support system positioned within a work cell in a manufacturing environment in accordance with an illustrative embodiment.

With reference now to FIG. 2, an illustration of an isometric view of support system 120 positioned within work cell 108 in manufacturing environment 100 from FIG. 1 is depicted in accordance with an illustrative embodiment. As depicted, front spar assembly 122 has been loaded onto support system 120. Front spar assembly 122 is structure 200 supported by support system 120 during the stage of manufacturing corresponding to work cell 108.

In this illustrative example, platform structure 123 includes front platform 202 and rear platform 204. Front platform 202 is configured to support front spar assembly 122. Rear platform 204 is configured to support rear spar assembly 124 shown in FIG. 1. Bridge system 125 connects front platform 202 and rear platform 204.

Platform structure 123 is movable. In some illustrative examples, front platform 202 and rear platform 204 may each be comprised of segments. These segments may be movable relative to each other in some cases. Depending on the implementation, a different segment may be used to hold each of plurality of supports 121. In other examples, one segment may be used to hold more than one support in plurality of supports 121.

Plurality of supports 121 is holding front spar assembly 122 in current configuration 206 in this illustrative example. Plurality of supports 121 includes supports 208, 210, 212, 214, 216, 218, 220, 222, 224, 226, 228, 230, 232, 234, 236, 238, 240, 242, 244, and 246. These supports may be drivable supports. These supports may also be referred to as mechanical stanchions or support structures. In some illustrative examples, these supports may be referred to as non-fixed fixtures that may function in a manner similar to monuments and that are drivable.

As depicted, each of plurality of supports 121 is associated with platform structure 123. In some illustrative examples, one or more of plurality of supports 121 may be movably associated with platform structure 123. In other words, one or more of plurality of supports 121 may be movable relative to platform structure 123. For example, support 218 may be movable relative to front platform 202 and thereby, movable relative to other supports in plurality of supports 121.

Metrology system 136 is used to identify current configuration 206 of front spar assembly 122. Plurality of transmitters 140 of metrology system 136 includes group of transmitters 251 assigned to work cell 108. As used herein, a "group of" items may include two or more of the item. In this manner, a group of transmitters may include two or more transmitters. In this illustrative example, group of transmitters 251 includes transmitter 250, transmitter 252, transmitter 254, and transmitter 256.

Each of plurality of target systems 141 receives the signals transmitted by group of transmitters 251. In this illustrative example, group of transmitters 251 generates transmitter data and plurality of target systems 141 generates metrology data that is sent to controller 138 shown in FIG. 1. The transmitter data is used to identify global coordinate system 258. As used herein, a "coordinate system" may be a two-dimensional coordinate system or a three-dimensional coordinate system. In this illustrative example, global coordinate system 258 is a three-dimensional coordinate system.

A different global coordinate system may be used for each work cell in plurality of work cells 104 in FIG. 1. In this illustrative example, global coordinate system 258 is specific to work cell 108. Global coordinate system 258 may be identified such that an origin of global coordinate system 258 is set relative to one of group of transmitters 251. In this illustrative example, global coordinate system 258 is identified with its origin set to the center point of transmitter 254.

Global coordinate system 258 includes global X-axis 262, global Y-axis 264, and global Z-axis 266. In this illustrative example, global X-axis 262 and global Y-axis 264 form a reference X-Y plane. The reference X-Y plane is substantially parallel to floor 102 in this example. The height of the reference X-Y plane with respect to global Z-axis 266 is identified relative to floor 102 in this example.

The metrology data generated by plurality of target systems 141 is used to identify a local coordinate system for a plurality of control points corresponding to plurality of supports 121. A control point corresponding to a support may be, for example, a connection point between that support and the component or portion of the component that is being supported by that support or is to be supported by that support. In particular, the control point may be a contact point at which the support contacts or will contact that component. In this manner, each of plurality of supports 121 provides at least one control point. In other illustrative examples, the control point may be a point offset from the connection point between that support and the component or portion of the component that is being supported by that support or is to be supported by that support.

The local coordinate system for a control point corresponding to a support may have an origin set to coincide with the control point. As one illustrative example, the local coordinate system of support 214 may have an origin set at a selected control point provided by support 214. Target system 272 may be associated with support 214. Target system 272 may generate metrology data that may be used to identify a local coordinate system for the control point corresponding to support 214.

The local coordinate systems identified for the control points corresponding to at least two of plurality of supports 121 may be used to develop front spar coordinate system 260. In this illustrative example, the local coordinate systems for a selected control point of support 208 and a selected control point of support 214 are selected for use in identifying front spar coordinate system 260 for front spar assembly 122. As depicted, front spar coordinate system 260 includes front spar Y-axis 274, front spar Z-axis 276, and front spar X-axis 278.

In this illustrative example, the origin of front spar coordinate system 260 is set as the origin of the local coordinate system identified for support 208, which is the selected control point for support 208. Front spar Y-axis 274 is identified as the axis connecting the origin of the local coordinate system for support 208 to the origin of the local coordinate system for support 214. Front spar Z-axis 276 is identified as the axis passing through the origin of front spar coordinate system 260 that is also substantially parallel to global Z-axis 266. With front spar Y-axis 274 and front spar Z-axis 276 known, front spar X-axis 278 may be identified.

Current configuration 206 of front spar assembly 122 may be identified based on at least one of the local coordinate systems for plurality of supports 121, front spar coordinate system 260, or some combination thereof. Current configuration 206 is compared to a selected configuration for front spar assembly 122.

In this illustrative example, the selected configuration for front spar assembly 122 may include at least one of a shape for front spar assembly 122 or a position of front spar assembly 122 relative to platform structure 123 in which front spar coordinate system 260 for front spar assembly 122 is substantially parallel to global coordinate system 258. In particular, the plane formed by front spar X-axis 278 and front spar Y-axis 274 may need to be substantially parallel to the reference plane formed by global X-axis 262 and global Y-axis 264. As used herein, a "position" includes a location, an orientation, or both.

In other illustrative examples, the selected configuration for front spar assembly 122 may include at least one of a shape for front spar assembly 122 or a position of front spar assembly 122 relative to platform structure 123 in which front spar coordinate system 260 for front spar assembly 122 is offset from global coordinate system 258 by some selected amount. This offset may include an angular offset, a translational offset, or both with respect to at least one of global X-axis 262, global Y-axis 264, or global Z-axis 266.

If current configuration 206 of front spar assembly 122, as determined by front spar coordinate system 260, is not within selected tolerances of the selected configuration for front spar assembly 122, plurality of supports 121 may be reconfigured to move front spar assembly 122 into the selected configuration. As one illustrative example, the supporting members of one or more of plurality of supports 121 connected to front spar assembly 122 may be moved with respect to at least one degree of freedom to move front spar assembly 122 into the selected configuration. The commands controlling the movement of these support elements may be generated by controller 138 in FIG. 1.

The identification of global coordinate system 258, the local coordinate systems for plurality of supports 121, and front spar coordinate system 260, along with the comparison of the current configuration of front spar assembly 122 to the selected configuration for front spar assembly 122 may be performed any number of times during manufacturing. For example, these steps may be performed continuously in order to allow continuous monitoring of the current configuration of front spar assembly 122 or periodically in order to allow periodic monitoring of the current configuration of front spar assembly 122. Thus, plurality of supports 121 may be reconfigured as needed to continuously or periodically correct for deviations from the selected configuration for structure 200.

Figure 3:
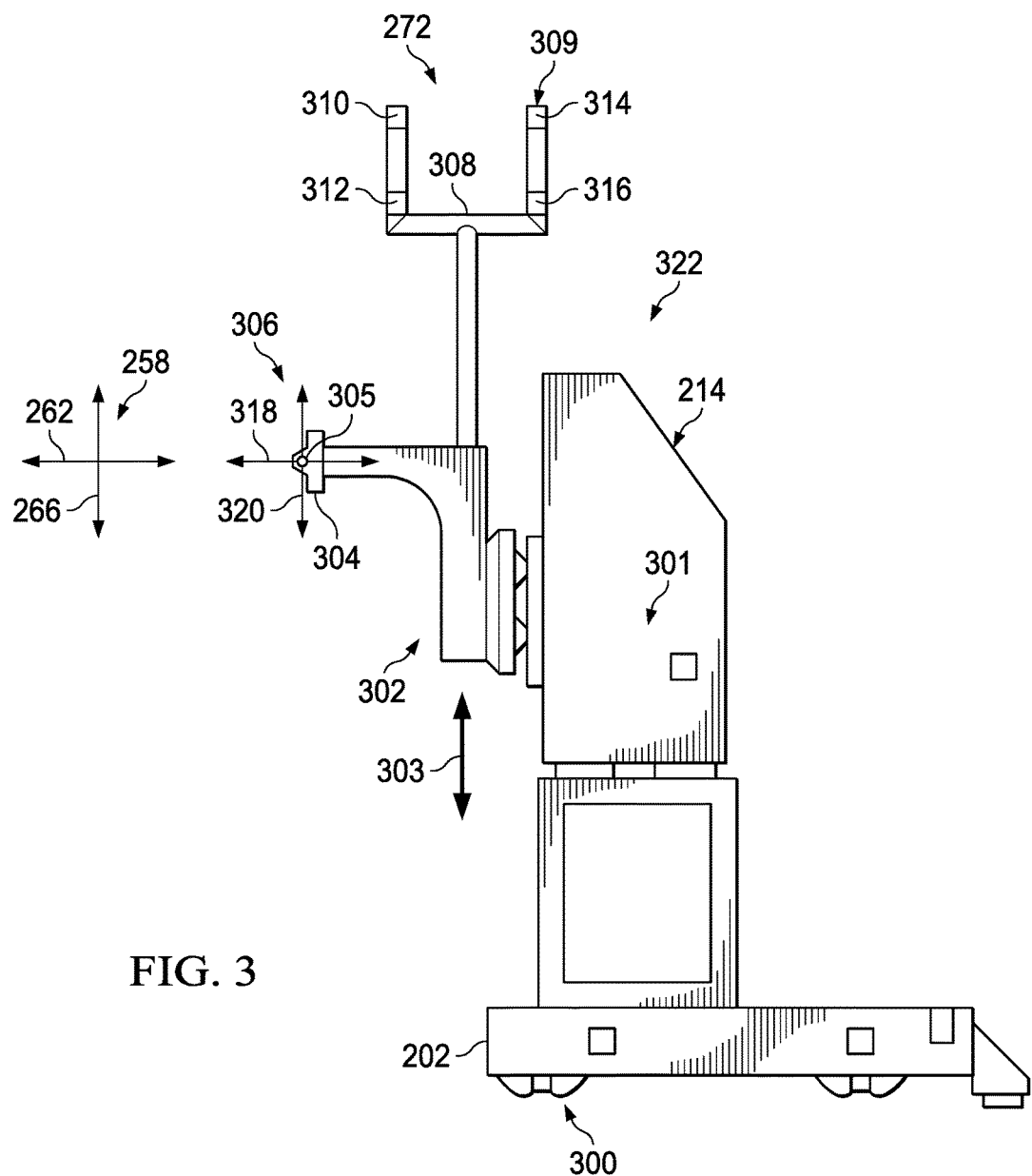
FIG. 3 is an illustration of a side view of a support associated with a front platform in accordance with an illustrative embodiment.

With reference now to FIG. 3, an illustration of a side view of support 214 associated with front platform 202 from FIG. 2 is depicted in accordance with an illustrative embodiment. As depicted, support 214 is associated with front platform 202. Front platform 202 has plurality of wheels 300 that allow front platform 202 to move.

Support 214 includes base structure 301 and supporting member 302. Base structure 301 is attached to front platform 202 in this illustrative example. Supporting member 302 is associated with base structure 301. Supporting member 302 may be movable relative to base structure 301. In this illustrative example, supporting member 302 is movable relative to base structure 301 in a direction substantially parallel to arrow 303.

Supporting member 302 is used to support a portion of front spar assembly 122 in FIG. 2. Supporting member 302 has element 304 that may be directly connected to front spar assembly 122 in FIG. 2. Control point 305 is the point at which front spar assembly 122 directly contacts element 304. Moving supporting member 302 relative to base structure 301 moves control point 305.

Target system 272 is used to identify local coordinate system 306 for control point 305 corresponding to support 214. The origin of local coordinate system 306 is set to coincide with control point 305 in this illustrative example.

As depicted, target system 272 is associated with support 214 and corresponds to control point 305. In particular, target system 272 is associated with supporting member 302. Target system 272 includes frame 308 and group of targets 309. Group of targets 309 include target 310, target 312, target 314, and target 316. Each of target 310, target 312, target 314, and target 316 takes the form of a sensor. In this illustrative example, a distance between each of target 310, target 312, target 314, and target 316 to control point 305 is known. Further, the distances of target 310, target 312, target 314, and target 316 relative to each other are known. In other words, target 310, target 312, target 314, and target 316 have a known arrangement with respect to each other.

Each of group of targets 309 is configured to receive the signals emitted by group of transmitters 251 in FIG. 2. Further, each of group of targets 309 is configured to generate position information in response to receiving these signals.

For example, target 310 may generate position information in response to receiving the signals emitted by group of transmitters 251 in FIG. 2. This position information may include information about the position of target 310 relative to global coordinate system 258. In this illustrative example, the position information includes an azimuth position and an elevation position of target 310 with respect to global X-axis 262 and global Z-axis 266, respectively.

The position information generated by each of group of targets 309 is used to identify local coordinate system 306 for control point 305. Local coordinate system 306 is a three-dimensional coordinate system having an origin at control point 305. Local coordinate system 306 includes local X-axis 318, a local Y-axis (not shown in this view), and local Z-axis 320. In this illustrative example, any number of coordinate system measuring techniques, alignment techniques, spatial transformation techniques, or other types of techniques may be used to identify local coordinate system 306.

In this illustrative example, support 214 has configuration 322. In configuration 322, local coordinate system 306 is substantially parallel to global coordinate system 258. In other words, all axes of local coordinate system 306 are substantially parallel to all axes of global coordinate system 258.

In one illustrative example, configuration 322 may be the configuration of support 214 needed to ensure that front spar assembly 122 in FIG. 2 is held in a selected configuration. However, support 214 may move out of configuration 322 during the manufacturing of wing 101 as described in FIG.

1, while supporting front spar assembly 122, which may cause front spar assembly 122 to move out of the selected configuration. For example, when ribs 126 in FIG. 1 are attached to front spar assembly 122, the additional weight of ribs 126 may cause support 214 to tilt out of configuration 322. An example of support 214 tilted is shown in FIG. 4.

Figure 4:
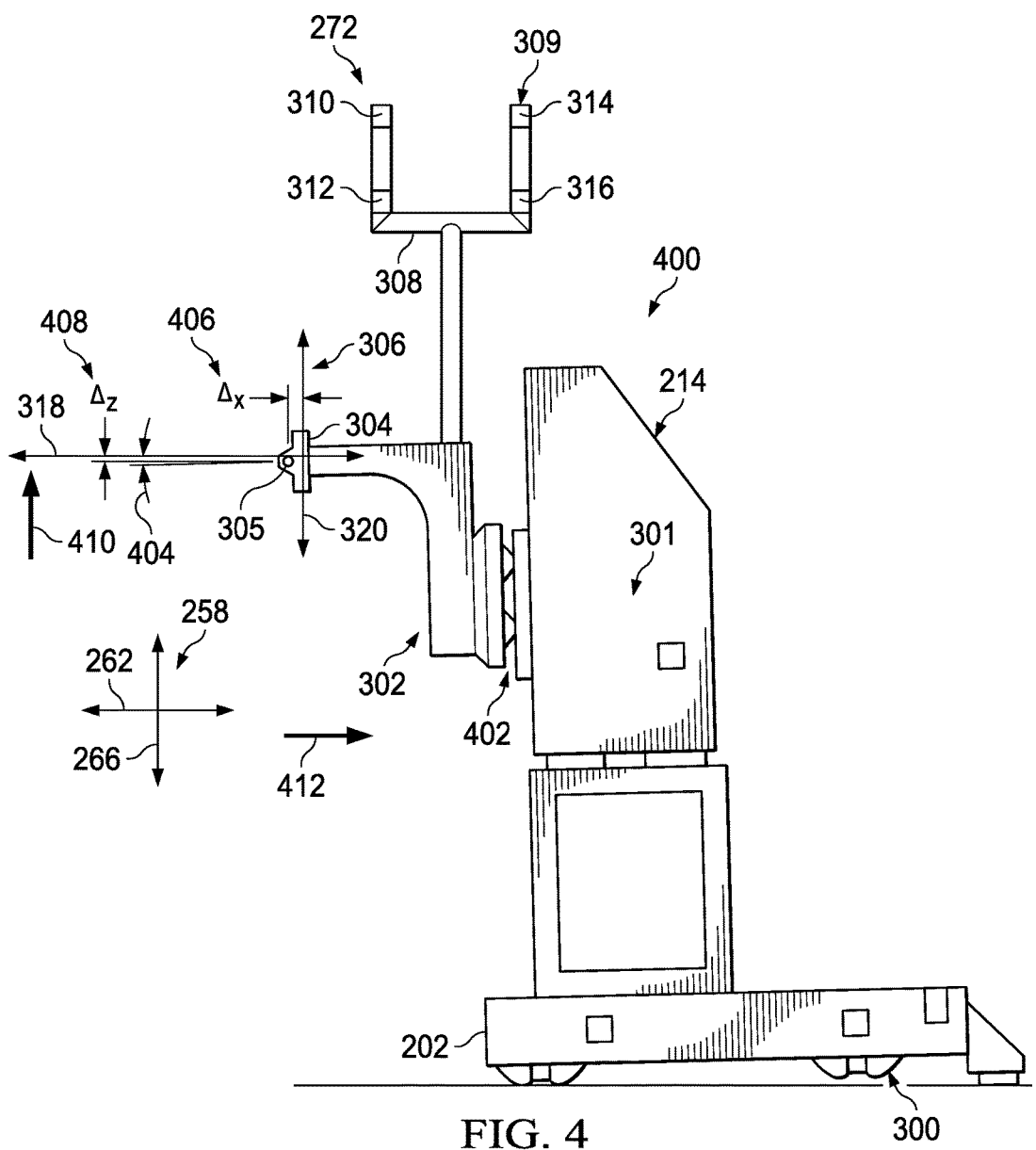
FIG. 4 is an illustration of a side view of a support tilted in accordance with an illustrative embodiment.

With reference now to FIG. 4, an illustration of a side view of support 214 tilted is depicted in accordance with an illustrative embodiment. As depicted, support 214 has tilted away from configuration 322 in FIG. 3 into configuration 400. Front spar assembly 122 shown in FIG. 2 may not be in the selected configuration for front spar assembly 122 when support 214 is in configuration 400 because control point 305 has moved out of a desired position for control point 305.

Supporting member 302 may need to be moved to move front spar assembly 122 into the selected configuration. In particular, supporting member 302 may need to be moved to move control point 305 to a corresponding desired position for control point 305. In some cases, other supporting members of other supports in plurality of supports 121 in FIG. 2 may also need to be moved to move front spar assembly 122 into the selected configuration. Moving supporting member 302 may be performed by at least one of moving supporting member 302 relative to base structure 301 using rail system 402 or moving base structure 301 using plurality of wheels 300.

As depicted, support 214 has tilted by angle 404 about control point 305. In particular, support 214 has rotated about the local Y-axis (not shown in this view) identified for support 214 by angle 404. In this illustrative example, target system 272 is used to identify new metrology data that may be used to determine how to move supporting member 302.

For example, controller 138 from FIG. 1 may use the metrology data generated by target system 272 to identify the value of angle 404. Based on angle 404, X-displacement 406 relative to local X-axis 318 and Z-displacement 408 relative to local Z-axis 320 may be computed. Controller 138 from FIG. 1 may generate commands to move supporting member 302 relative to base structure 301 in the direction of arrow 410 to correct for Z-displacement 408 and to move base structure 301, and thereby supporting member 302, using plurality of wheels 300 in the direction of arrow 412 to correct for X-displacement 406. This movement of supporting member 302 may substantially correct for the tilting of support 214.

Of course, when support 214 is considered in light of all of plurality of supports 121 in FIG. 2, supporting member 302 may need to be further moved in some other manner in order to move front spar assembly 122 into the selected configuration for front spar assembly 122. Controller 138 from FIG. 1 may use the metrology data provided by all of plurality of target systems 141 in FIGS. 1-2 to move one or more of the supporting members of plurality of supports 121 to move front spar assembly 122 into the selected configuration for front spar assembly 122.

Figure 5:
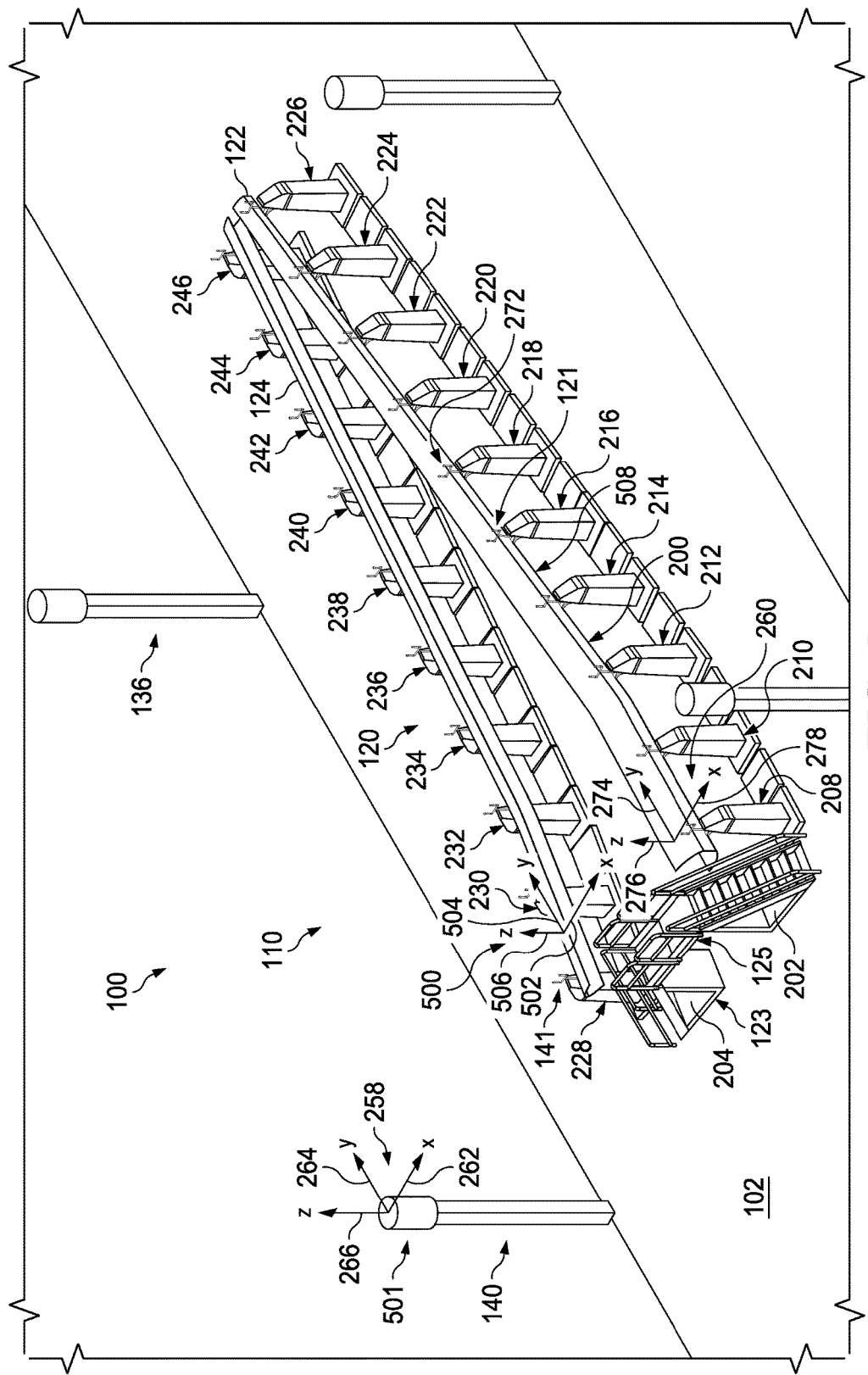
FIG. 5 is an illustration of an isometric view of a support system positioned within a work cell in a manufacturing environment in accordance with an illustrative embodiment.

With reference now to FIG. 5, an illustration of an isometric view of support system 120 positioned within work cell 110 in manufacturing environment 100 from FIG. 1 is depicted in accordance with an illustrative embodiment. As depicted, rear spar assembly 124 has been loaded onto support system 120. Front spar assembly 122 and rear spar assembly 124 together form structure 200 supported by support system 120 during the stage of manufacturing corresponding to work cell 110.

As depicted, plurality of transmitters 140 includes group of transmitters 501 in work cell 110. Group of transmitters 501 may be used to re-identify global coordinate system 258. The metrology data generated by plurality of target systems 141 and group of transmitters 501 may be used to re-identify the local coordinate systems for the control points provided by plurality of supports 121. Front spar coordinate system 260 may be re-identified in a manner similar to the manner described in FIG. 2 above.

Further, rear spar coordinate system 500 may be identified in a manner similar to the manner described for identifying front spar coordinate system 260 in FIG. 2. The local coordinate systems identified for the control points of at least two of plurality of supports 121 may be used to develop rear spar coordinate system 500. In this illustrative example, the local coordinate systems for a selected control point provided by support 230 and a selected control point provided by support 236 are selected for use in identifying rear spar coordinate system 500. As depicted, rear spar coordinate system 500 includes rear spar Y-axis 504, rear spar Z-axis 506, and rear spar X-axis 502.

In this illustrative example, the origin of rear spar coordinate system 500 is set as the origin of the local coordinate system identified for support 230, which is the selected control point for support 230. Rear spar Y-axis 504 is identified as the axis connecting the origin of the local coordinate system for support 230 to the origin of the local coordinate system for support 236. Rear spar Z-axis 506 is identified as the axis passing through the origin of rear spar coordinate system 500 that is also substantially parallel to global Z-axis 266. With rear spar Y-axis 504 and rear spar Z-axis 506 known, rear spar X-axis 502 may be identified.

In this illustrative example, the selected configuration for structure 200 may include a position of rear spar assembly 124 relative to platform structure 123 in which rear spar coordinate system 500 for rear spar assembly 124 is substantially parallel to global coordinate system 258. In particular, the plane formed by rear spar X-axis 502 and rear spar Y-axis 504 may need to be substantially parallel to the reference plane formed by global X-axis 262 and global Y-axis 264.

In this manner, the selected configuration for structure 200 that includes both front spar assembly 122 and rear spar assembly 124 may be one in which both the X-Y plane of rear spar coordinate system 500 and the X-Y plane of front spar coordinate system 260 are substantially parallel to the reference X-Y plane of global coordinate system 258. The selected configuration for structure 200 may ensure that front spar assembly 122 and rear spar assembly 124 are held in certain positions relative to each other during the assembly of wing 101 as depicted in FIG. 1.

In other illustrative examples, the selected configuration for structure 200 may be a position of rear spar assembly 124 relative to platform structure 123 in which rear spar coordinate system 500 for rear spar assembly 124 is offset from global coordinate system 258 by some selected amount. This offset may include an angular offset, a translational offset, or both with respect to at least one of global X-axis 262, global Y-axis 264, or global Z-axis 266.

In this illustrative example, current configuration 508 of structure 200, which includes front spar assembly 122 and rear spar assembly 124, may be identified based on at least one of the local coordinate systems for plurality of supports 121, front spar coordinate system 260, rear spar coordinate system 500, or some combination thereof. Current configuration 508 is compared to the selected configuration for structure 200. If current configuration 508 of structure 200 is not within selected tolerances of the selected configuration for structure 200, plurality of supports 121 may be reconfigured to move structure 200 back into the selected configuration.

The identification of global coordinate system 258, the local coordinate systems for the control points provided by plurality of supports 121, front spar coordinate system 260, and rear spar coordinate system 500 and the comparison of current configuration 508 of structure 200 to the selected configuration for structure 200 may be performed any number of times during manufacturing. For example, these steps may be performed continuously or periodically in order to allow continuous or period monitoring, respectively, of current configuration 508 of structure 200. Thus, plurality of supports 121 may be reconfigured as needed to continuously or periodically correct for deviations from the selected configuration for structure 200.

Figure 6:
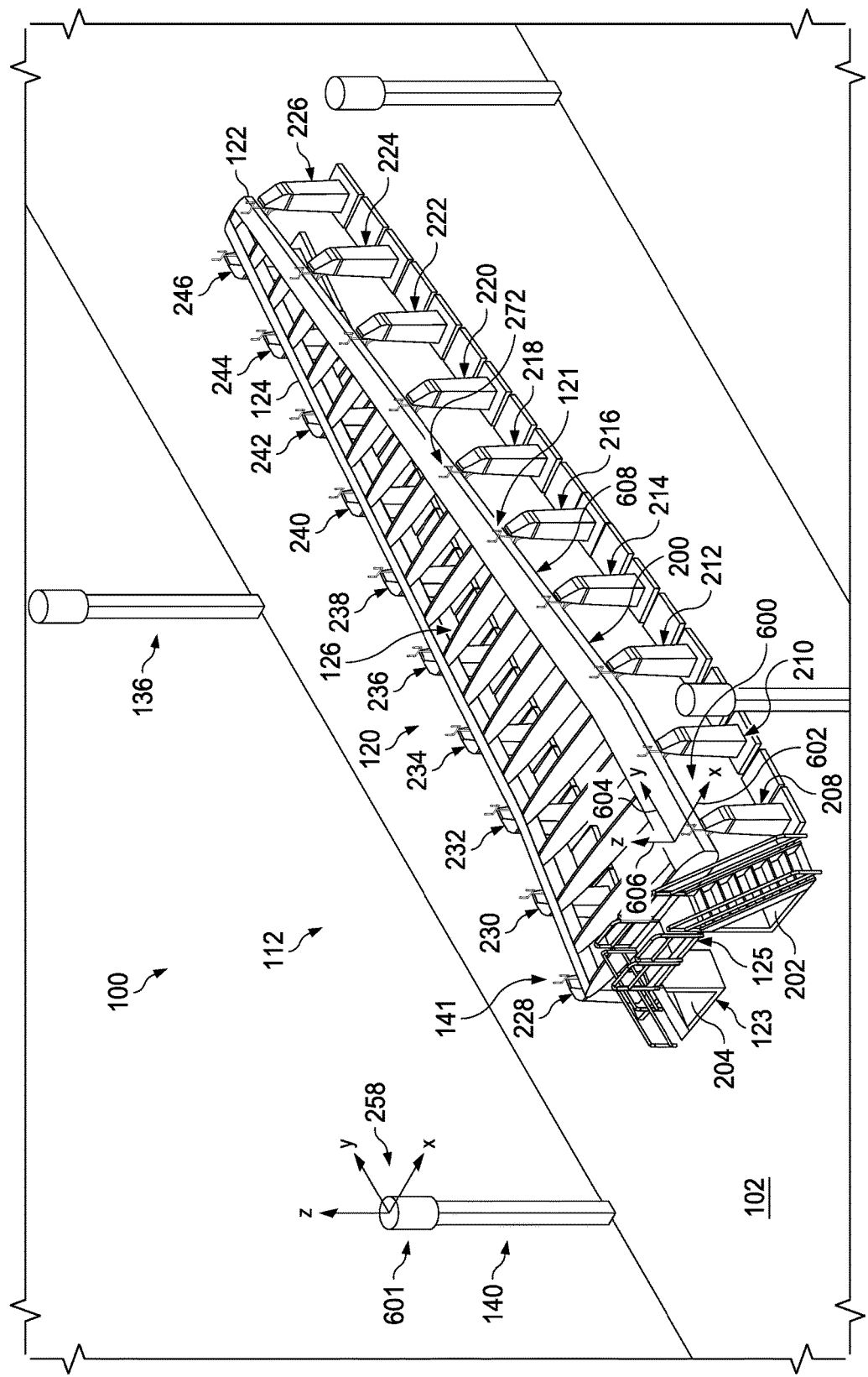
FIG. 6 is an illustration of an isometric view of a support system positioned within a work cell in a manufacturing environment in accordance with an illustrative embodiment.

With reference now to FIG. 6, an illustration of an isometric view of support system 120 positioned within work cell 112 in manufacturing environment 100 from FIG. 1 is depicted in accordance with an illustrative embodiment. As depicted, ribs 126 have been loaded onto support system 120. Ribs 126 have been attached to front spar assembly 122 and rear spar assembly 124.

Front spar assembly 122, rear spar assembly 124, and ribs 126 together form structure 200 supported by support system 120 during the stage of manufacturing corresponding to work cell 112. In some cases, structure 200 may be referred to as a wing structure, a wing assembly, or a rib assembly at this stage of wing manufacturing.

As depicted, plurality of transmitters 140 includes group of transmitters 601 in work cell 112. Group of transmitters 601 may be used to re-identify global coordinate system 258. The metrology data generated by plurality of target systems 141 and group of transmitters 601 may be used to re-identify the local coordinate systems of the control points provided by plurality of supports 121 and to identify wing coordinate system 600. At least three of the local coordinate systems for plurality of supports 121 may be used to identify wing coordinate system 600.

Wing coordinate system 600 includes wing X-axis 602, wing Y-axis 604, and wing Z-axis 606. Wing coordinate system 600 may be set as having an origin at the origin of the local coordinate system for the control point provided by support 208.

Wing Y-axis 604 is defined as the axis connecting the origin of the local coordinate system for the control point provided by support 208 and the origin of the local coordinate system for the control point provided by support 226. The origin of the local coordinate system for the control point provided by support 208, the origin of the local coordinate system for the control point provided by support 226, and the origin of the local coordinate system for the control point provided by support 230 may be used to define the X-Y plane for wing coordinate system 600 and thereby, wing X-axis 602.

In this illustrative example, current configuration 608 of structure 200, which includes front spar assembly 122, rear spar assembly 124, and ribs 126, may be identified based on at least one of the local coordinate systems for the control points provided by plurality of supports 121, wing coordinate system 600, or some combination thereof. Current configuration 608 is compared to the selected configuration for structure 200. If current configuration 608 of structure 200 is not within selected tolerances of the selected configuration for structure 200, plurality of supports 121 may be reconfigured to move structure 200 back into the selected configuration.

The identification of global coordinate system 258, the local coordinate systems for the control points provided by plurality of supports 121, wing coordinate system 600, and the comparison of current configuration 608 of structure 200 to the selected configuration for structure 200 may be performed any number of times during manufacturing. For example, these steps may be performed continuously or periodically in order to allow continuous or periodic monitoring, respectively, of current configuration 608 of structure 200. Thus, plurality of supports 121 may be reconfigured as needed to continuously or periodically correct for deviations from the selected configuration for structure 200.

Figure 7:
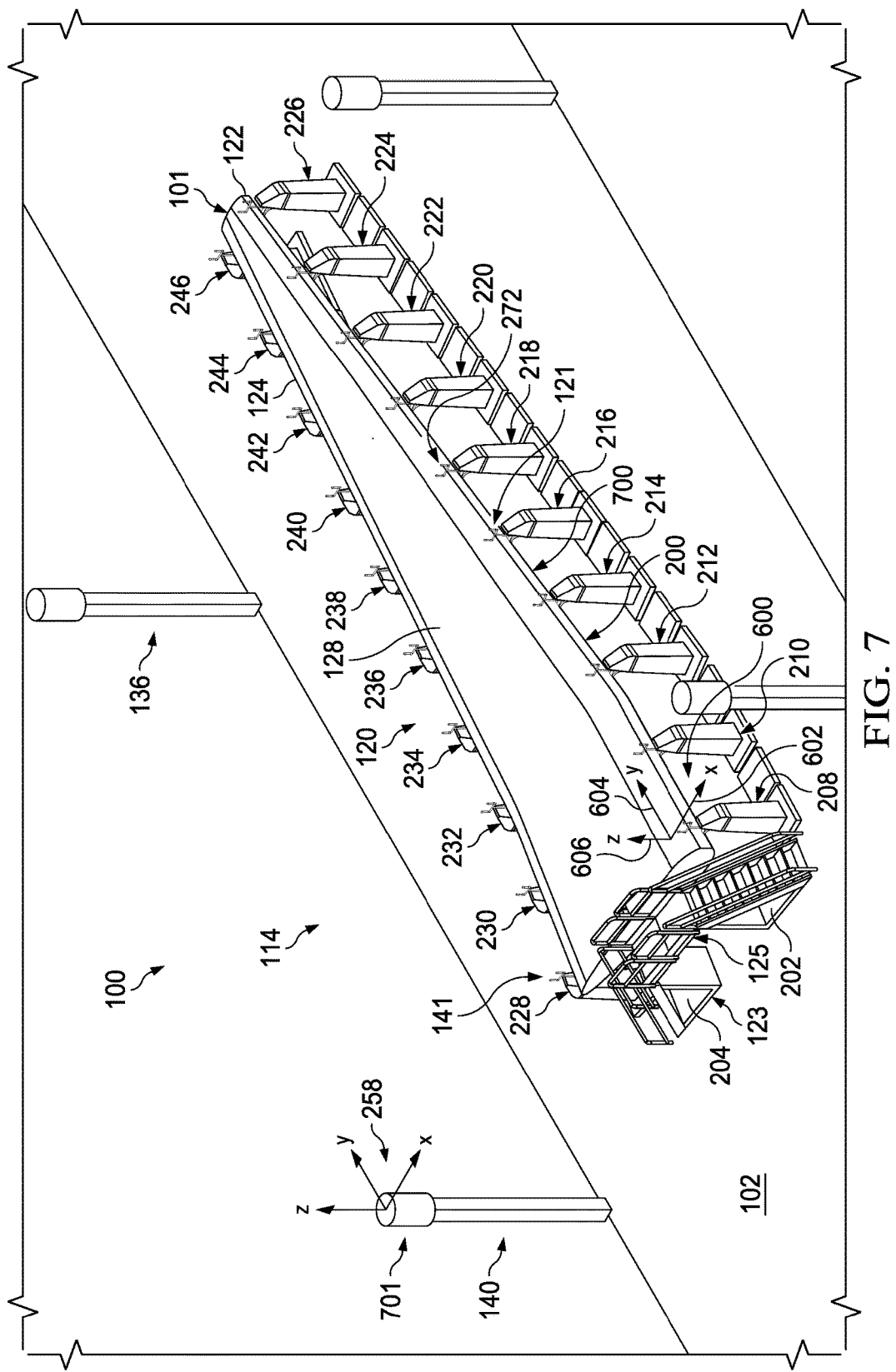
FIG. 7 is an illustration of an isometric view of a support system positioned within a work cell in a manufacturing environment in accordance with an illustrative embodiment.

With reference now to FIG. 7, an illustration of an isometric view of support system 120 positioned within work cell 114 in manufacturing environment 100 from FIG. 1 is depicted in accordance with an illustrative embodiment. As depicted, skin panel 128 has been loaded onto support system 120.

Skin panel 128 has been attached to at least one of front spar assembly 122, rear spar assembly 124, and ribs 126 (not shown in this view). Together, front spar assembly 122, rear spar assembly 124, ribs 126 (not shown in this view), and skin panel 128 form structure 200 supported by support system 120 during the stage of manufacturing corresponding to work cell 114.

As depicted, plurality of transmitters 140 includes group of transmitters 701 in work cell 112. Group of transmitters 701 may be used to re-identify global coordinate system 258. The metrology data generated by plurality of target systems 141 and group of transmitters 701 may be used to re-identify the local coordinate systems of the control points provided by plurality of supports 121 and to re-identify wing coordinate system 600.

Structure 200 has current configuration 700 in this illustrative example. Current configuration 700 of structure 200 may be identified based on at least one of the local coordinate systems for the control points provided by plurality of supports 121, wing coordinate system 600, or some combination thereof. Current configuration 700 is compared to the selected configuration for structure 200. If current configuration 700 of structure 200 is not within selected tolerances of the selected configuration for structure 200, plurality of supports 121 may be reconfigured to move structure 200 back into the selected configuration.

The identification of global coordinate system 258, the local coordinate systems for the control points provided by plurality of supports 121 and wing coordinate system 600 and the comparison of the current configuration of structure 200 to the selected configuration for structure 200 may be performed any number of times during manufacturing to continuously or periodically monitor the current configuration of structure 200. Thus, plurality of supports 121 may be reconfigured as needed to continuously or periodically correct for deviations from the selected configuration for structure 200.

Figure 8:
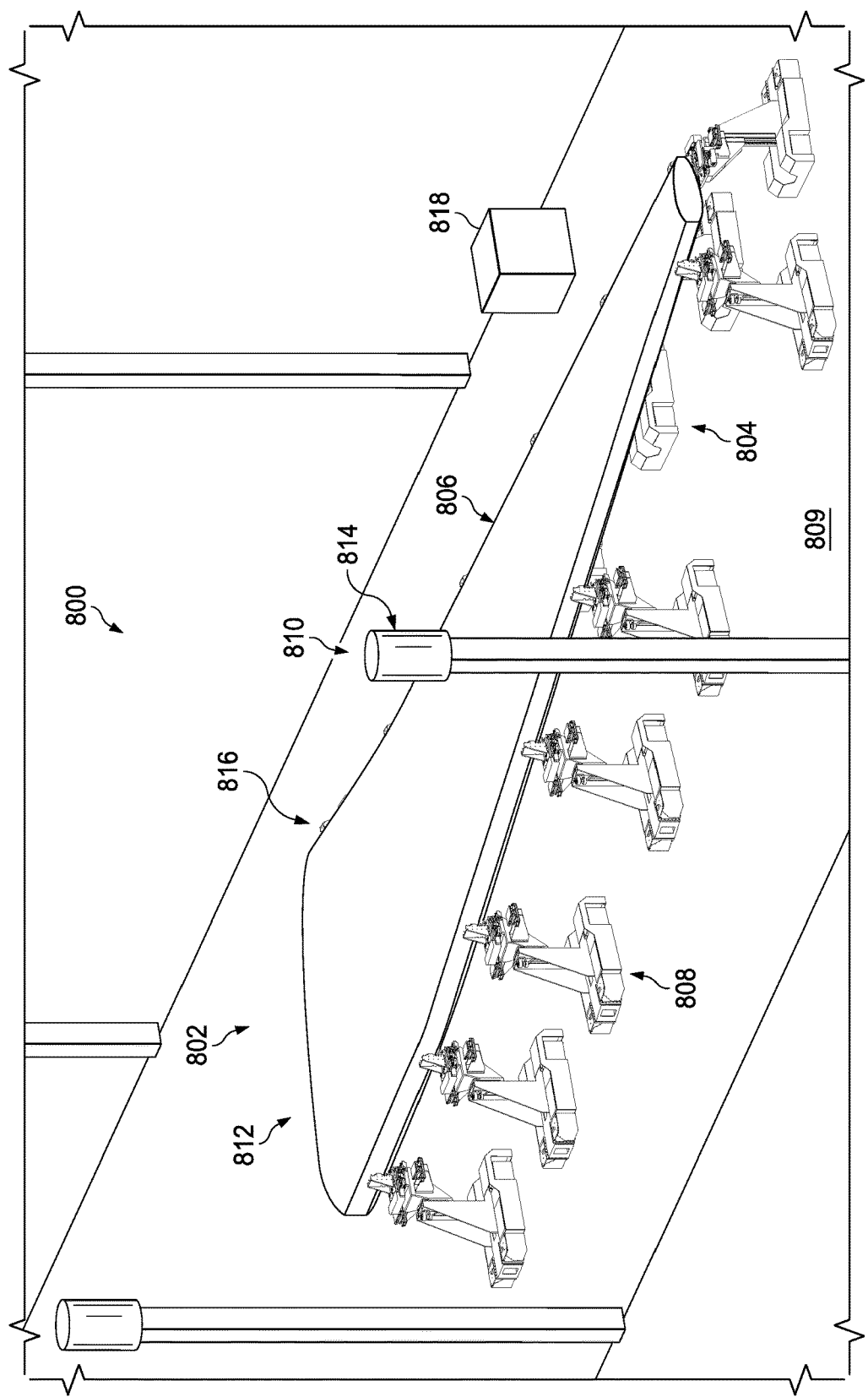
FIG. 8 is an illustration of an isometric view of a different type of support system in a work cell in a manufacturing environment in accordance with an illustrative embodiment.

With reference now to FIG. 8, an illustration of an isometric view of a different type of support system in a work cell in a manufacturing environment is depicted in accordance with an illustrative embodiment. In this illustrative example, manufacturing environment 800 includes work cell 802. Support system 804 is used to support structure 806 in work cell 802. Structure 806 is a partially completed wing in this illustrative example.

Support system 804 includes plurality of drivable supports 808. Each of plurality of drivable supports 808 is configured to move independently of the other drivable supports in plurality of drivable supports 808. Further, each of plurality of drivable supports 808 is configured to move with at least one degree of freedom. Each of plurality of drivable supports 808 is configured to move relative to floor 809 of manufacturing environment 800. In particular, each of plurality of drivable supports 808 may be driven robotically or manually. In one illustrative example, each of plurality of drivable supports 808 may be capable of autonomously driving from location to location on floor 809 of manufacturing environment 800.

Metrology system 810 may be used to control the movement and configuring of plurality of drivable supports 808 to ensure that current configuration 812 of structure 806 is within selected tolerances of a selected configuration for structure 806. For example, metrology system 810 may provide metrology data that is used to drive plurality of drivable supports 808.

Metrology system 810 may be implemented in a manner similar to metrology system 136 in FIG. 1. As depicted, metrology system 810 includes plurality of transmitters 814, plurality of target systems 816, and controller 818.

The illustrations of manufacturing environment 100, support system 120, and metrology system 136 in FIGS. 1-7 and manufacturing environment 800, support system 804, and metrology system 810 in FIG. 8 are not meant to imply physical or architectural limitations to the manner in which an illustrative embodiment may be implemented. Other components in addition to or in place of the ones illustrated may be used. Some components may be optional.

The different components shown in FIGS. 1-8 may be illustrative examples of how components shown in block form in FIG. 9 below can be implemented as physical structures. Additionally, some of the components in FIGS. 1-8 may be combined with components in FIG. 9, used with components in FIG. 9, or a combination of the two.

Figure 9:
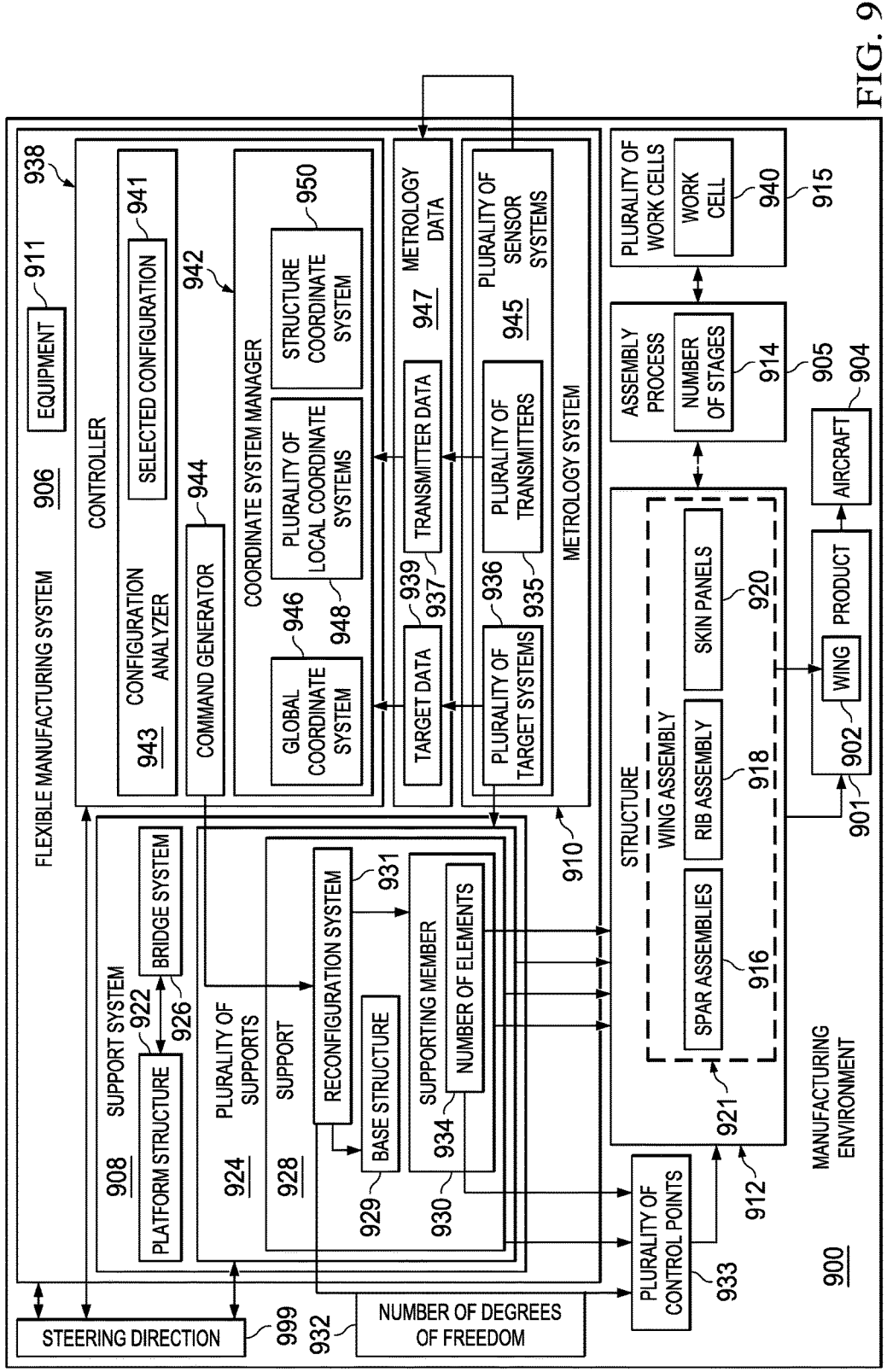
FIG. 9 is an illustration of a manufacturing environment in the form of a block diagram in accordance with an illustrative embodiment.

With reference now to FIG. 9, an illustration of a manufacturing environment is depicted in the form of a block diagram in accordance with an illustrative embodiment. In this illustrative example, manufacturing environment 100 in FIG. 1 and manufacturing environment 800 in FIG. 8 are examples of implementations for manufacturing environment 900 in FIG. 9.

In this illustrative example, manufacturing environment 900 is an example of an environment in which product 901 may be manufactured. Product 901 is a physical product that is comprised of any number of parts, components, subassemblies, assemblies, or systems. In one illustrative example, product 901 may take the form of wing 902 for aircraft 904. Wing 101 assembled in FIG. 1 may be an example of one implementation for wing 902. In other illustrative examples, product 901 may take some other form such as, for example, without limitation, a fuselage for aircraft 904, a control surface for aircraft 904, an engine system for aircraft 904, the hull of a ship, a satellite, a housing, a frame, a container, or some other type of product.

The manufacturing of product 901 may be performed in a number of different ways. The manufacturing of product 901 may include performing any number of operations. For example, a manufacturing process may be used to manufacture product 901. This manufacturing process may include any number of assembly, drilling, countersinking, fastening, coupling, sealing, coating, inspecting, painting, or other suitable types of operations.

In one illustrative example, this manufacturing process used to manufacture product 901 includes assembly process 905. Flexible manufacturing system 906 may be used to perform assembly process 905. In some illustrative examples, flexible manufacturing system 906 may be referred to as a mobile assembly system. Depending on the implementation, flexible manufacturing system 906 may be partially autonomous or fully autonomous. When fully autonomous, flexible manufacturing system 906 may be referred to as an autonomous flexible manufacturing system.

As depicted, flexible manufacturing system 906 may include support system 908, metrology system 910, and controller 938. Depending on the implementation, flexible manufacturing system 906 may or may not include equipment 911. Equipment 911 may include any number of devices, tools, systems, robotic devices, or combination thereof for performing assembly process 905.

Support system 908 is used to support and hold structure 912 during number of stages 914 of assembly process 905. As used herein, a "number of" items may include one or more items. In this manner, number of stages 914 may include one or more stages. Support system 120 in FIG. 1 and support system 804 in FIG. 8 are examples of implementations for support system 908. Support system 908 may be flexible, drivable, and reconfigurable.

Structure 912 is product 901 during any one of number of stages 914. In this manner, structure 912 may be one or more components used to form product 901, a partially completed product 901, or a fully completed product 901. In some cases, when number of stages 914 includes multiple stages, structure 912 may change from one stage in number of stages 914 to the next stage in number of stages 914 of assembly process 905.

For example, when product 901 to be manufactured is wing 902, spar assemblies 916, rib assembly 918, and skin panels 920 may be installed at different stages in number of stages 914 of assembly process 905. In some cases, structure 912 may be referred to as wing assembly 921, which includes spar assemblies 916, rib assembly 918, skin panels 920, other components, or some combination thereof, depending on the particular stage of number of stages 914.

In this illustrative example, number of stages 914 may be performed in plurality of work cells 915 within manufacturing environment 900. Plurality of work cells 915 may be one or more locations or areas within manufacturing environment 900. Each of plurality of work cells 915 may be designated for performing at least one of number of stages 914 of assembly process 905. The changing of structure 200 in FIG. 2 from work cell 108 shown in FIG. 2, to work cell 110 in FIG. 5, to work cell 112 in FIG. 6, and to work cell 114 in FIG. 7 is an example of one manner in which structure 912 in FIG. 9 may change during assembly process 905.

In one illustrative example, support system 908 includes platform structure 922 and plurality of supports 924. Platform structure 922 may be comprised of a number of platforms that are movable. In particular, the number of platforms may be a number of drivable platforms.

In some illustrative examples, when platform structure 922 is comprised of two or more platforms, bridge system 926 may be used to connect these platforms to each other. In this manner, these platforms may be referred to as connecting platforms. Platform structure 123 in FIGS. 1-7 is an example of one implementation for platform structure 922. Further, bridge system 125 in FIGS. 1-7 is an example of one implementation for bridge system 926.

Plurality of supports 924 may be associated with platform structure 922. Plurality of supports 121 in FIGS. 1-8 is an example of one implementation for plurality of supports 924. In some cases, platform structure 922 may be comprised of segments that are independently movable relative to each other. In these cases, each of plurality of supports 924 may be associated with a corresponding segment of platform structure 922. In some cases, two or more supports may be associated with a single segment of platform structure 922. By being associated with platform structure 922 that is movable, plurality of supports 924 may be moved within manufacturing environment 900 between work cells in plurality of work cells 915.

Plurality of supports 924 may be collectively drivable in some illustrative examples. In other illustrative examples, one or more of plurality of supports 924 may be independently drivable. Support 928 is an example of one of plurality of supports 924. Support 928 may be referred to as a drivable support in other illustrative examples. In some cases, support 928 may take the form of a non-fixed fixture that is drivable and functions as a non-fixed monument. In some illustrative examples, support 928 may take the form of an automated guided vehicle (AGV).

Support 928 includes base structure 929, supporting member 930, and reconfiguration system 931 in this illustrative example. Base structure 929 may be associated with platform structure 922. In some cases, base structure 929 may be movably associated with platform structure 922 such that base structure 929 may be moved relative to platform structure 922. In other illustrative examples, base structure 929 may be fixedly associated with a portion of platform structure 922 such that base structure 929 may not be movable relative to this portion of platform structure 922 and may move with this portion of platform structure 922.

Supporting member 930 may be associated with base structure 929. Number of elements 934 may be associated with supporting member 930. Each of number of elements 934 may be used to hold and support at least a portion of structure 912. Number of elements 934 may be used to connect supporting member 930, and thereby base structure 929, to structure 912. Number of elements 934 may include, for example, without limitation, at least one of a fastening device, a connection plate, a bracket, or some other type of connection element.

Each of number of elements 934 provides a control point. The control point provided by a particular element in number of elements 934 is selected from one of a point on support 928, a point on structure 912, and a control point between structure 912 and the particular element. For example, the control point may be the point at which the particular element contacts structure 912. In other words, the control point may take the form of a connection point formed between the particular element and structure 912. In other illustrative examples, the control point may be offset from this connection point.

The control point is controllable by reconfiguration system 931. In particular, the control point is movable with at least one degree of freedom by reconfiguration system 931.

Reconfiguration system 931 may control a position of a particular control point by reconfiguring support 928. Reconfiguring support 928 includes moving at least one of supporting member 930 of support 928 relative to base structure 929, an element in number of elements 934 relative to base structure 929, base structure 929 relative to platform structure 922, base structure 929 relative to a floor of manufacturing environment 900 in which manufacturing is being performed, or some other type of movement. Each of these movements may have at least one degree of freedom.

Each of plurality of supports 924 may have a supporting member with a number of elements associated with the supporting member that provide a corresponding number of control points. In this manner, plurality of supports 924 provides plurality of control points 933. Further, each of plurality of supports 924 may have a reconfiguration system capable of controlling the portion of plurality of control points 933 corresponding to that support.

In this manner, plurality of supports 924 may provide number of degrees of freedom 932 for each control point in plurality of control points 933. Number of degrees of freedom 932 may include one or more translational degrees of freedom, one or more rotational degrees of freedom, or both.

In this illustrative example, reconfiguration system 931 may be comprised of any number of components. For example, without limitation, reconfiguration system 931 may include any number of wheels, rails, tracks, sliders, motors, actuators, bearings, other types of movable elements, other types of movement devices, or combination thereof.

In this illustrative example, metrology system 910 and controller 938 are used to control the reconfiguration system of each of plurality of supports 924, including reconfiguration system 931. Metrology system 136 in FIG. 1 and metrology system 810 in FIG. 8 are examples of implementations for metrology system 910. Controller 138 in FIG. 1 and controller 818 in FIG. 8 are examples of implementations for controller 938.

Metrology system 910 may take a number of different forms. Depending on the implementation, metrology system 910 may comprise at least one of an indoor global positioning system, an optical positioning system, a radio frequency positioning system, an acoustic positioning system, a laser tracker, a vision system, a motion capture system, a laser radar system, or a photogrammetry system. Each of these systems may be comprised of any number of sensor devices configured to provide metrology data.

In one illustrative example, metrology system 910 includes plurality of sensor systems 945. Each of plurality of sensor systems 945 may be comprised of one or more sensor devices or sensors. In this illustrative example, plurality of sensor systems 945 may include plurality of transmitters 935 and plurality of target systems 936. Plurality of transmitters 140 and plurality of target systems 141 in FIG. 1 are examples of implementations for plurality of transmitters 935 and plurality of target systems 936, respectively.

In this example, each of plurality of transmitters 935 may take the form of an optical transmitter configured to emit at least two signals. These signals may be, for example, laser beams. In some illustrative examples, plurality of transmitters 935 includes a different group of transmitters designated for each of plurality of work cells 915. The group of transmitters designated for use when support system 908 is located in one work cell may share one or more transmitters with another group of transmitters designated for use when support system 908 is located in another work cell.

Each of plurality of target systems 936 is associated with a corresponding support in plurality of supports 924. One or more target systems may be associated with a single support, depending on the implementation. In some cases, a single target system is associated with the supporting member of a corresponding support. In other cases, a different target system may be associated with each of the number of elements associated with the supporting member of a corresponding support.

In one illustrative example, plurality of target systems 936 may include a target system for each of plurality of control points 933. In other words, each of plurality of target systems 936 may correspond to a particular control point in plurality of control points 933. A target system for a corresponding control point may have a fixed relationship with the corresponding control point. In this manner, the movement of the target system may be directly coupled to the movement of the corresponding control point such that any movement of the corresponding control point may result in a substantially equal movement of the target system.

Each target system in plurality of target systems 936 comprises a plurality of targets that includes at least three targets. These targets may be sensors configured to receive the signals emitted by plurality of transmitters 935. In one illustrative example, plurality of transmitters 935 may be a plurality of indoor global positioning system (iGPS) transmitters configured to emit laser beams. Further, in this example, the targets of plurality of target systems 936 may be indoor global positioning system sensors configured to receive these laser beams and generate position information in response to receiving these laser beams.

The plurality of targets that make up a target system in plurality of target systems 936 may have a known arrangement, or predefined arrangement, with respect to each other. Further, a distance between each of the plurality of targets of a target system to a control point corresponding to the target system may be known, or predefined.

Metrology system 910 generates metrology data 947. In particular, metrology data 947 may include transmitter data 937 and target data 939.

Plurality of transmitters 935 generates transmitter data 937, which may be metrology data that may be referred to as position data in some illustrative examples. In particular, each of plurality of transmitters 935 generates transmitter data 937. Transmitter data 937 generated by a particular transmitter in plurality of transmitters 935 may include data about a position of that particular transmitter with respect to two dimensions or three dimensions, depending on the implementation. As used herein, a "position" may be comprised of a location, an orientation, or both. A location, as used herein, may be with respect to a two-dimensional coordinate system or a three-dimensional coordinate system.

Plurality of target systems 936 generates target data 939 in response to receiving the signals emitted by plurality of transmitters 935. When support system 908 is positioned within a particular work cell in plurality of work cells 915, plurality of target systems 936 generate target data 939 in response to receiving the signals emitted by a group of transmitters in plurality of transmitters 935 designated for that particular work cell.

Controller 938 receives transmitter data 937 and target data 939 generated by plurality of transmitters 935 and plurality of target systems 936, respectively. Controller 938 uses transmitter data 937 and target data 939 to control the reconfiguration systems of plurality of supports 924. In particular, controller 938 uses transmitter data 937 and target data 939 to generate commands for controlling the reconfiguration systems of plurality of supports 924.

Controller 938 may be implemented using hardware, firmware, software, or some combination thereof. In one illustrative example, controller 938 may be implemented using data processing system 1400 described in FIG. 14 below. Depending on the implementation, controller 938 may be implemented using a computer system comprised of one or more computers, a laptop, a tablet, a processor unit, a microprocessor, some other type of data processing unit, or some combination thereof.

In one illustrative example, support system 908 may support and hold structure 912 while support system 908 is located in work cell 940 in plurality of work cells 915. Controller 938 uses transmitter data 937 and target data 939 to determine whether structure 912 has a current configuration in work cell 940 that is within selected tolerances of selected configuration 941 for structure 912. Selected configuration 941 may include at least one of a three-dimensional shape for structure 912, a position for structure 912 relative to platform structure 922, a position for structure 912 relative to a floor of manufacturing environment 900, a two-dimensional profile of structure 912, or some combination thereof.

Controller 938 includes coordinate system manager 942, configuration analyzer 943, and command generator 944. Coordinate system manager 942 uses transmitter data 937 received from the group of transmitters in plurality of transmitters 935 designated for work cell 940 to identify global coordinate system 946 for work cell 940. Global coordinate system 258 in FIG. 2 and FIGS. 5-7 is an example of one implementation for global coordinate system 946. Global coordinate system 946 is a three-dimensional coordinate system in this illustrative example.

Coordinate system manager 942 uses target data 939 received from plurality of target systems 936 to identify plurality of local coordinate systems 948 for plurality of control points 933. Each of plurality of local coordinate systems 948 may correspond to a particular control point in plurality of control points 933. In this illustrative example, each of plurality of local coordinate systems 948 may have an origin set to coincide with the position of the corresponding control point in plurality of control points 933.

In some cases, coordinate system manager 942 uses at least one of transmitter data 937 received from plurality of transmitters 935, target data 939 received from plurality of target systems 936, or plurality of local coordinate systems 948 to identify structure coordinate system 950 for structure 912. These coordinate systems are three-dimensional coordinate systems in this illustrative example.

Local coordinate system 306 in FIGS. 3-4 is an example of one implementation for one of plurality of local coordinate systems 948. Each of front spar coordinate system 260 in FIG. 2, rear spar coordinate system 500 in FIG. 5, and wing coordinate system 600 in FIGS. 6-7 is an example of an implementation for structure coordinate system 950 at different stages in assembly process 905.

Configuration analyzer 943 uses global coordinate system 946, at least one of plurality of local coordinate systems 948, structure coordinate system 950, or some combination thereof to identify the current configuration of structure 912 in work cell 940. For example, configuration analyzer 943 may use any number of curve fitting techniques, regression techniques, other types of mathematical techniques, or combination thereof to identify the current configuration of structure 912.

Configuration analyzer 943 then determines whether the current configuration identified is within selected tolerances of selected configuration 941. If the current configuration of structure 912 is within selected tolerances of selected configuration 941, support system 908 may not need to be reconfigured.

If the current configuration of structure 912 is not within selected tolerances of selected configuration 941, support system 908 may need to be reconfigured. If support system 908 needs to be reconfigured, command generator 944 generates commands to control the reconfiguration system of each of a selected portion of plurality of supports 924 to move structure 912 into selected configuration 941. The selected portion may include one or more supports. Reconfiguring at least one of plurality of supports 924 reconfigures support system 908.

In particular, if support system 908 needs to be reconfigured, each of plurality of control points 933 that is in an undesired position based on the current configuration of structure 912 is identified as a selected number of control points. An undesired position for a control point may be a displacement from a desired position for the control point, as defined by selected configuration 941, in which the displacement is outside of selected tolerances.

Commands are generated to reconfigure a selected portion of plurality of supports 924 corresponding to the selected number of control points to move the selected number of control points to a corresponding number of desired positions defined based on selected configuration 941. These commands are sent from controller 938 to the selected portion of plurality of supports 924.

In some illustrative examples, selected configuration 941 for structure 912 may change during assembly process 905. For example, selected configuration 941 for structure 912 may change as structure 912 changes during assembly process 905. In other illustrative examples, selected configuration 941 may be the same throughout assembly process 905.

In this illustrative example, steering direction 999 may be provided for different components in flexible manufacturing system 906. As an example, steering direction 999 may be provided for each of plurality of supports 924 as they move through manufacturing environment 900. For example, steering direction 999 may be provided for support 928. Steering direction 999 also may be provided for equipment 911 in this illustrative example.

Steering direction 999 may take the form of commands, instructions, path generation, physically changing the direction of plurality of supports 924, and other methods of guidance for plurality of supports 924. In this illustrative example, steering direction 999 may dynamically change as conditions within manufacturing environment 900 change.

Steering direction 999 may be provided by at least one of controller 938, a system controller, a human operator, or some other suitable device. As an example, controller 938 may send commands to steer plurality of supports 924. In yet another example, one or more human operators may steer one of plurality of supports 924 by physically changing its direction. In other illustrative examples, each of plurality of supports 924 may steer itself, not under the direction of a controller or human operator.

The illustration of manufacturing environment 900 in FIG. 9 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In other illustrative examples, support system 908 may not include platform structure 922 or bridge system 926. For example, plurality of supports 924 may be a plurality of drivable supports capable of moving within manufacturing environment 900 independently and without the use of platform structure 922.

In some illustrative examples, platform structure 922 may be a single platform and bridge system 926 may not be needed. Further, although support system 908 is described as holding structure 912 during assembly process 905, support system 908 may be used to hold structure 912 during some other type of manufacturing process.

Figure 10:
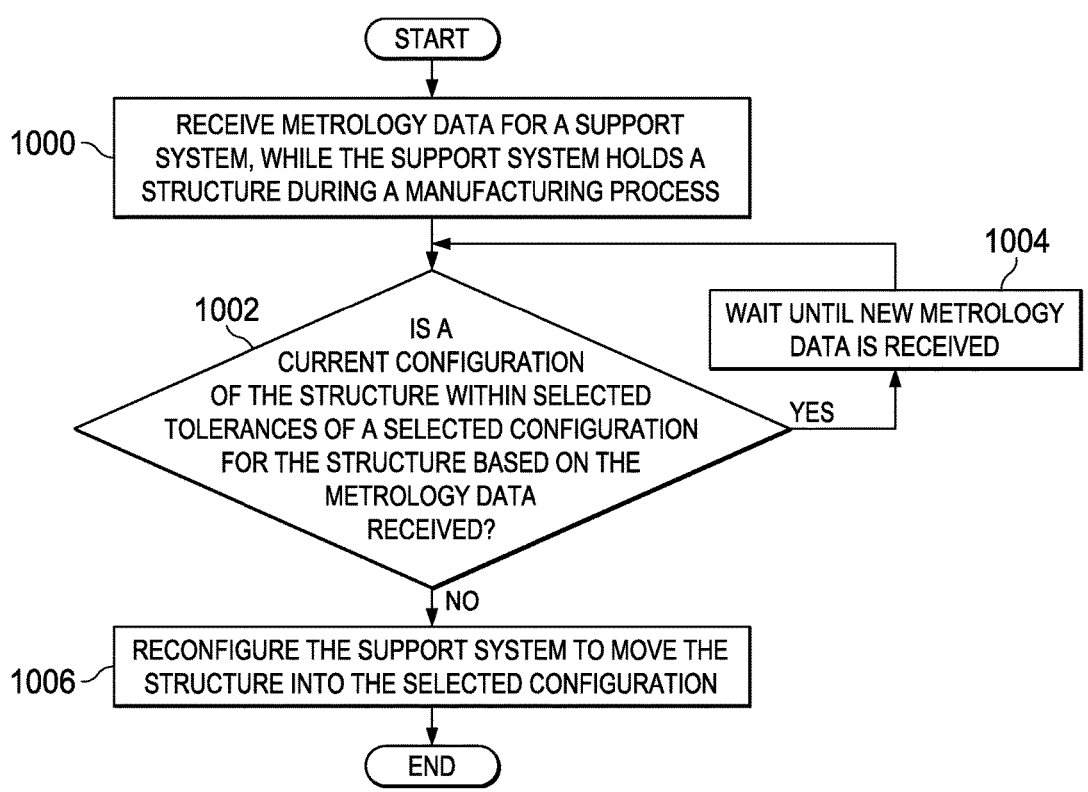
FIG. 10 is an illustration of a process for reconfiguring a support system in the form of a flowchart in accordance with an illustrative embodiment.

With reference now to FIG. 10, an illustration of a process for reconfiguring a support system is depicted in the form of a flowchart in accordance with an illustrative embodiment. The process illustrated in FIG. 10 may be used to reconfigure, for example, support system 908 in FIG. 9.

The process begins by receiving metrology data for a support system, while the support system holds a structure during a manufacturing process (operation 1000). The support system may include a plurality of supports, each of which is used to support and hold a different portion of the structure. A determination is made as to whether a current configuration of the structure is within selected tolerances of a selected configuration for the structure based on the metrology data received (operation 1002).

If the current configuration of the structure is within the selected tolerances of the selected configuration for the structure, the process waits until new metrology data is received (operation 1004), with the process then proceeding to operation 1002 as described above. Otherwise, if, in operation 1002, the current configuration of the structure is not within the selected tolerances of the selected configuration for the structure, the support system is reconfigured to move the structure into the selected configuration (operation 1006), with the process terminating thereafter.

Figure 11:
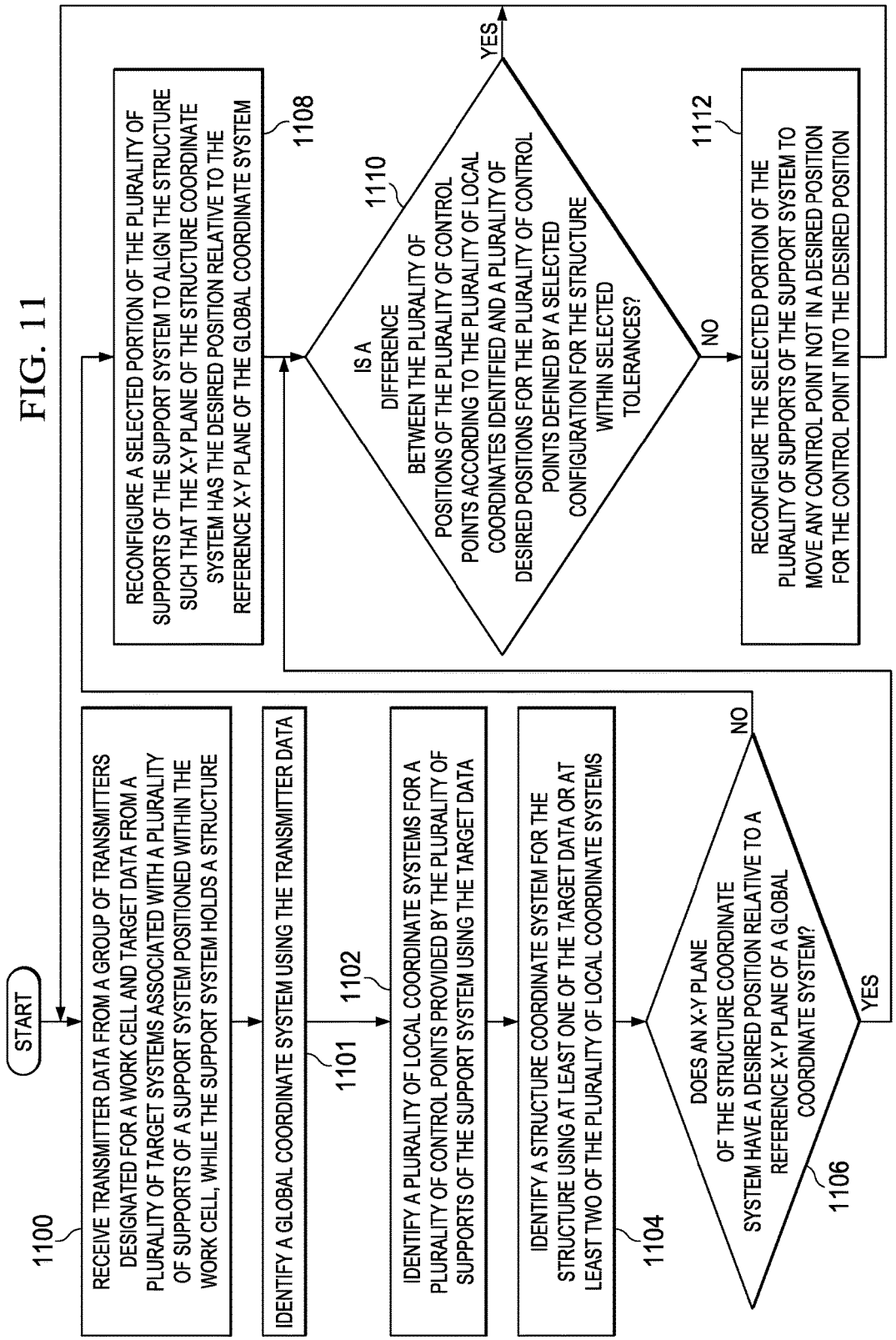
FIG. 11 is an illustration of a process for reconfiguring a support system in the form of a flowchart in accordance with an illustrative embodiment.

With reference now to FIG. 11, an illustration of a process for reconfiguring a support system is depicted in the form of a flowchart in accordance with an illustrative embodiment. The process illustrated in FIG. 11 may be an example of one manner in which the process described in FIG. 10 may be implemented.

The process begins by receiving transmitter data from a group of transmitters designated for a work cell and target data from a plurality of target systems associated with a plurality of supports of a support system positioned within the work cell, while the support system holds a structure (operation 1100). Then, a global coordinate system is identified using the transmitter data (operation 1101).

Next, a plurality of local coordinate systems for a plurality of control points provided by the plurality of supports of the support system is identified using the target data (operation 1102). The plurality of local coordinate systems may be centered at the plurality of control points such that the origins of the plurality of local coordinate systems provide the plurality of positions for the plurality of control points.

Then, a structure coordinate system is identified for the structure using at least one of the target data or at least two of the plurality of local coordinate systems (operation 1104). Thereafter, a determination is made as to whether an X-Y plane of the structure coordinate system has a desired position relative to a reference X-Y plane of a global coordinate system (operation 1106). In one illustrative example, the desired position may be one in which the X-Y plane of the structure coordinate system is substantially parallel to the reference X-Y plane of a global coordinate system. In another illustrative example, the desired position may include at least one of an angular offset or a translational offset relative to the reference X-Y plane of a global coordinate system.

If the X-Y plane of the structure coordinate system does not have the desired position relative to the reference X-Y plane of the global coordinate system, a selected portion of the plurality of supports of the support system is reconfigured to align the structure such that the X-Y plane of the structure coordinate system has the desired position relative to the reference X-Y plane of the global coordinate system (operation 1108). The reconfiguration performed in operation 1108 may include repeating steps 1100 through 1108 until the X-Y plane of the structure coordinate system is determined to have the desired position relative to the reference X-Y plane of the global coordinate system in operation 1106.

Then, a determination is made as to whether a difference between the plurality of positions of the plurality of control points according to the plurality of local coordinates identified and a plurality of desired positions for the plurality of control points defined by a selected configuration for the structure is within selected tolerances (operation 1110). If the difference in operation 1110 is within the selected tolerances, the process returns to operation 1100 as described above.

Otherwise, the selected portion of the plurality of supports of the support system is reconfigured to move any control point not in a desired position for the control point into the desired position (operation 1112). The process then returns to operation 1100 as described above. The reconfiguration performed in operation 1108 may include repeating steps 1100 through 1112 until the difference in operation 1110 is determined to be within selected tolerances.

With reference again to operation 1106, if the X-Y plane of the structure coordinate system does have the desired position relative to the reference X-Y plane of the global coordinate system, the process proceeds directly to operation 1110 as described above. In this manner, the alignment in operation 1108 is considered unnecessary.

Figure 12:
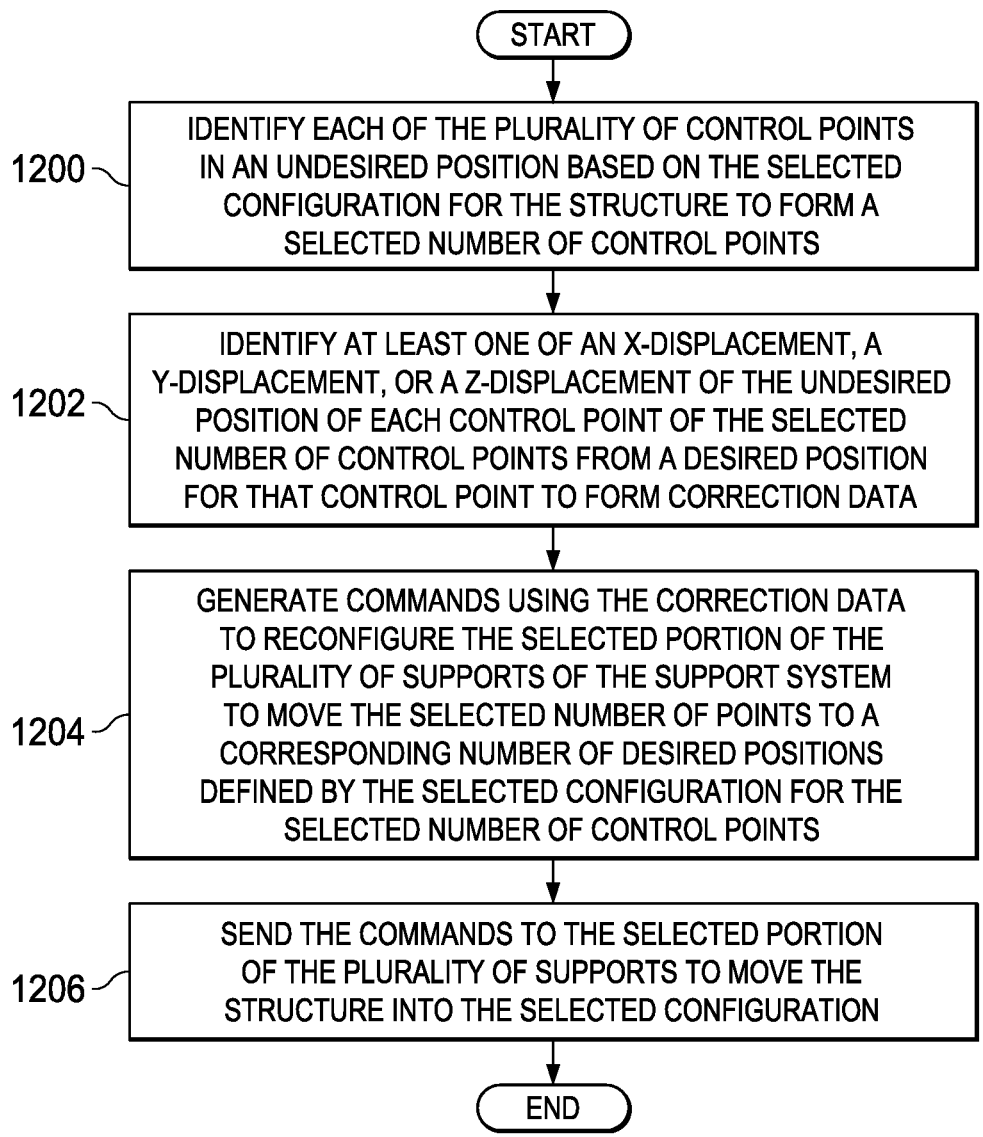
FIG. 12 is an illustration of a process for moving control points in the form of a flowchart in accordance with an illustrative embodiment.

With reference now to FIG. 12, an illustration of a process for moving control points is depicted in the form of a flowchart in accordance with an illustrative embodiment. The process illustrated in FIG. 12 may be used to implement operation 1112 in FIG. 11.

The process begins by identifying each of the plurality of control points in an undesired position based on the selected configuration for the structure to form a selected number of control points (operation 1200). Next, at least one of an X-displacement, a Y-displacement, or a Z-displacement of the undesired position of each control point of the selected number of control points from a desired position for that control point is identified to form correction data (operation 1202).

Commands are generated using the correction data to reconfigure the selected portion of the plurality of supports of the support system to move the selected number of points to a corresponding number of desired positions defined by the selected configuration for the selected number of control points (operation 1204). The selected portion of the plurality of supports may include one or more of the plurality of supports. The commands are then sent to the selected portion of the plurality of supports to move the structure into the selected configuration (operation 1206), with the process terminating thereafter.

Figure 13:
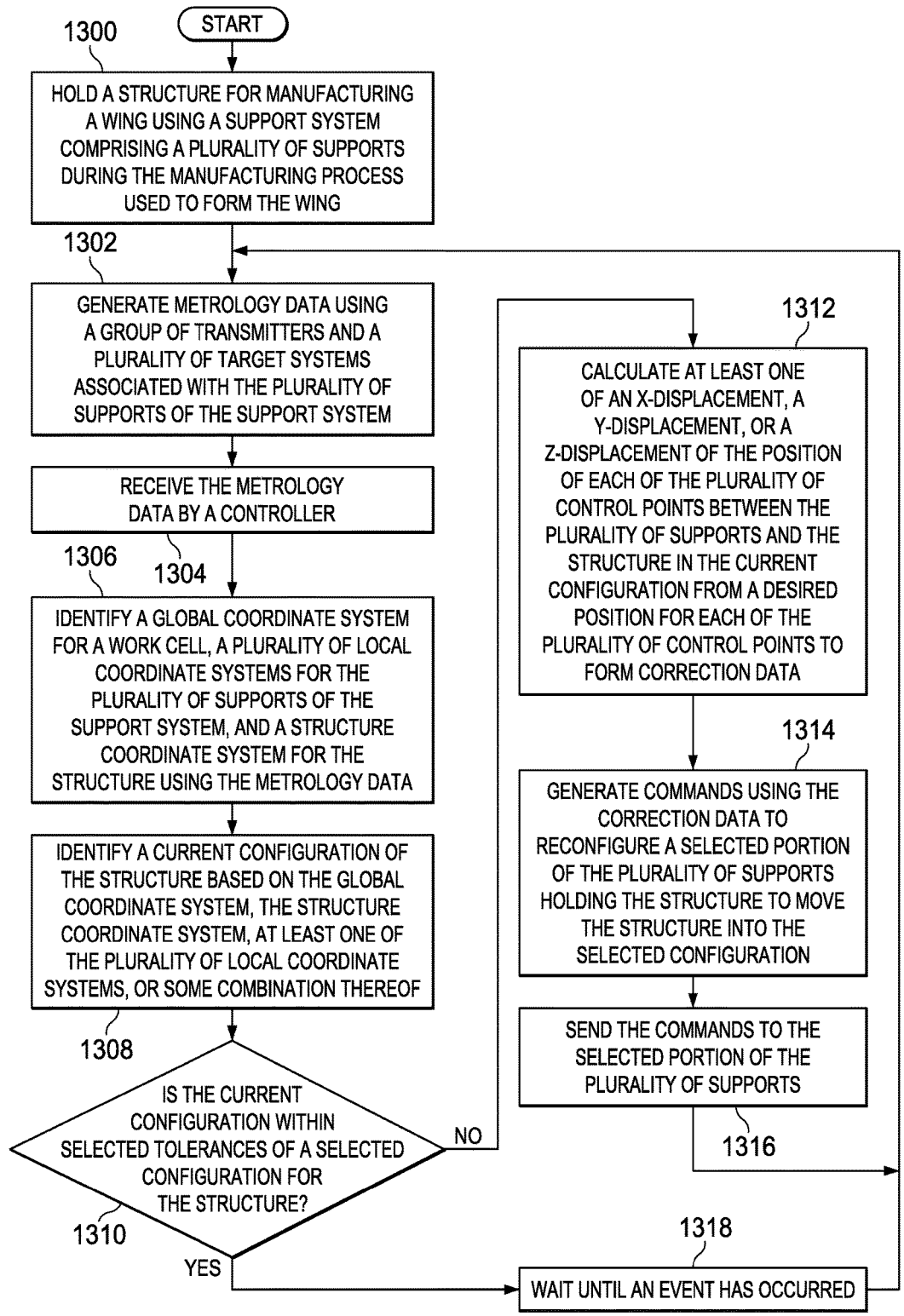
FIG. 13 is an illustration of a process for reconfiguring a support system in the form of a flowchart in accordance with an illustrative embodiment.

With reference now to FIG. 13, an illustration of a process for reconfiguring a support system is depicted in the form of a flowchart in accordance with an illustrative embodiment. The process illustrated in FIG. 13 may be used to reconfigure, for example, support system 908 in FIG. 9 during the manufacturing of, for example, wing 902 in FIG. 9.

The process begins by holding a structure for manufacturing a wing using a support system comprising a plurality of supports during the manufacturing process used to form the wing (operation 1300). Metrology data is generated using a group of transmitters and a plurality of target systems associated with the plurality of supports of the support system (operation 1302). Each target system in the plurality of target systems may be associated with a corresponding element of a supporting member of a corresponding support in the plurality of supports. In some cases, more than one target system may be associated with a particular support in the plurality of supports.

The metrology data is received by a controller (operation 1304). The controller identifies a global coordinate system for a work cell, a plurality of local coordinate systems for the plurality of supports of the support system, and a structure coordinate system for the structure using the metrology data (operation 1306). In operation 1306, a local coordinate system is identified for each of the plurality of supports in the support system.

Thereafter, a current configuration of the structure is identified based on the global coordinate system, the structure coordinate system, at least one of the plurality of local coordinate systems, or some combination thereof (operation 1308). In one illustrative example, in operation 1308, the current configuration may be identified by identifying the position of each of the plurality of control points between the structure and the plurality of supports.

A determination is made as to whether the current configuration is within selected tolerances of a selected configuration for the structure (operation 1310). If the current configuration is not within the selected tolerances of the selected configuration for the structure, at least one of an X-displacement, a Y-displacement, or a Z-displacement of the position of each of the plurality of control points between the plurality of supports and the structure in the current configuration from a desired position for each of the plurality of control points is calculated to form correction data (operation 1312).

Thereafter, commands are generated using the correction data to reconfigure a selected portion of the plurality of supports holding the structure to move the structure into the selected configuration (operation 1314). The selected portion of the plurality of supports may include one or more of the plurality of supports. The commands are then sent to the selected portion of the plurality of supports (operation 1316), with the process then returning to operation 1302. Thus, in response to receiving the commands, the plurality of the supports may cause the configuration of the structure to move towards the selected configuration. Operation 1316 may proceed to operation 1302 such that a new current configuration of the structure may be evaluated.

With reference again to operation 1310, if the current configuration is within the selected tolerances of the selected configuration for the structure, the process may wait until an event has occurred (operation 1318) before returning to operation 1302 as described above. The event may be the lapse of a timer, movement of the support system with the structure to a new work cell, a new component being added to structure, the installation of a part for wing, or some other event. In some cases, the event may be a null event or such a minimal period of time that the monitoring of the configuration of the structure may be performed substantially continuously.

In this manner, the current configuration of the structure may be continuously or periodically monitored during the manufacturing of the wing. The support system may be reconfigured as needed to ensure that the current configuration is within selected tolerances of the selected configuration for the structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 14, an illustration of a data processing system is depicted in the form of a block diagram in accordance with an illustrative embodiment. Data processing system 1400 may be used to implement controller 938 in FIG. 9. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise at least one of a number of processors, a multi-processor core, or some other type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications and programs run by processor unit 1404 may be located in storage devices 1406. Storage devices 1406 may be in communication with processor unit 1404 through communications framework 1402. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices. For example, persistent storage 1416 may comprise a hard drive, a flash memory, a rewritable optical disk, a rewritable magnetic tape, or some combination of the above. The media used by persistent storage 1416 may or may not be removable.

Communications unit 1408 allows data processing system 1400 to communicate with other data processing systems, devices, or both. Communications unit 1408 may provide communications using physical communications links, wireless communications links, or both.

Input/output unit 1410 allows input to be received from and output to be sent to other devices connected to data processing system 1400. For example, input/output unit 1410 may allow user input to be received through a keyboard, a mouse, some other type of input device, or a combination thereof. As another example, input/output unit 1410 may allow output to be sent to a printer connected to data processing system 1400.

Display 1412 is configured to display information to a user. Display 1412 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1404 using computer-implemented instructions. These instructions may be referred to as program code, computer usable program code, or computer readable program code and may be read and executed by one or more processors in processor unit 1404.

In these examples, program code 1418 is located in a functional form on computer readable media 1420, which is selectively removable, and may be loaded onto or transferred to data processing system 1400 for execution by processor unit 1404. Program code 1418 and computer readable media 1420 together form computer program product 1422. In this illustrative example, computer readable media 1420 may be computer readable storage media 1424 or computer readable signal media 1426.

Computer readable storage media 1424 is a physical or tangible storage device used to store program code 1418 rather than a medium that propagates or transmits program code 1418. Computer readable storage media 1424 may be, for example, without limitation, an optical or magnetic disk or a persistent storage device that is connected to data processing system 1400.

Alternatively, program code 1418 may be transferred to data processing system 1400 using computer readable signal media 1426. Computer readable signal media 1426 may be, for example, a propagated data signal containing program code 1418. This data signal may be an electromagnetic signal, an optical signal, or some other type of signal that can be transmitted over physical communications links, wireless communications links, or both.

The illustration of data processing system 1400 in FIG. 14 is not meant to provide architectural limitations to the manner in which the illustrative embodiments may be implemented. The different illustrative embodiments may be implemented in a data processing system that includes components in addition to or in place of those illustrated for data processing system 1400. Further, components shown in FIG. 14 may be varied from the illustrative examples shown.

The illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in the form of a block diagram in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in the form of a block diagram in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, flexible manufacturing system 906 from FIG. 9 may be used to assemble aircraft 1600 or any number of aircraft structures for aircraft 1600 during any one of the stages of aircraft manufacturing and service method 1500. For example, without limitation, support system 908 and metrology system 910 of flexible manufacturing system 906 from FIG. 9 may be used during the manufacturing of an aircraft structure for aircraft 1600 during at least one of component and subassembly manufacturing 1506, system integration 1508, routine maintenance and service 1514, or some other stage of aircraft manufacturing and service method 1500.

In particular, support system 908 and metrology system 910 may be used to ensure that aircraft structures for aircraft 1600 are held in selected configurations for the aircraft structures during assembly. These aircraft structures may include for example, one or more components of airframe 1602, propulsion system 1608, or some other structure for aircraft 1600.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of and reduce the cost of aircraft 1600.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of maintaining a selected configuration for a structure, the method comprising:
   generating metrology data by:
      emitting signals from a group of transmitters positioned relative to a support system;
      receiving the signals at each of a plurality of target systems associated with the support system;
      generating position information by the each of the plurality of target systems to form the metrology data;
   receiving, by a controller, the metrology data for a plurality of supports comprising the support system while the support system holds the structure, wherein each of the plurality of supports comprises a supporting member connected to the structure;
   determining, by a controller, whether a current configuration of the structure is within selected tolerances of the selected configuration for the structure based on the metrology data; and
   moving the support system, by a controller, to move the structure held by the support system into the selected configuration in response to a determination that the current configuration of the structure is not within the selected tolerances of the selected configuration for the structure.

2. The method of claim 1, wherein each target system in the plurality of target systems comprises at least three targets configured to receive the signals, wherein the at least three targets have a known arrangement.

3. The method of claim 1, wherein determining whether the current configuration of the structure is within the selected tolerances of the selected configuration for the structure based on the metrology data comprises:
   identifying a plurality of positions for a plurality of control points using the metrology data, wherein each of the plurality of control points is selected from one of a point on a support in the support system and a connection point between the structure and the support.

4. The method of claim 1, wherein determining whether the current configuration of the structure is within the selected tolerances of the selected configuration for the structure based on the metrology data comprises:
   identifying a plurality of local coordinate systems for a plurality of supports of the support system using the metrology data.

5. The method of claim 4, wherein determining whether the current configuration of the structure is within the selected tolerances of the selected configuration for the structure based on the metrology data comprises:
   identifying a structure coordinate system for the structure using the plurality of local coordinate systems.

6. The method of claim 5, wherein determining whether the current configuration of the structure is within the selected tolerances of the selected configuration for the structure based on the metrology data comprises:
   comparing the structure coordinate system to a global coordinate system.

7. The method of claim 6, wherein determining whether the current configuration of the structure is within the selected tolerances of the selected configuration for the structure based on the metrology data comprises:
   determining whether a plane of the structure coordinate system is parallel to a plane of the global coordinate system.

8. The method of claim 7, wherein moving the support system to move the structure held by the support system into the selected configuration comprises moving a supporting member connected to the structure to align the structure coordinate system with the global coordinate system such that the plane of the structure coordinate system is substantially parallel to the plane of the global coordinate system.

9. An apparatus comprising:
a support system configured to hold a structure, wherein the support system comprises a plurality of supports and wherein each of the plurality of supports comprises a supporting member connected to the structure;
a metrology system that generates metrology data for the plurality of supports comprising the support system while the support system holds the structure, wherein the metrology system comprises:
a group of transmitters configured to emit signals from positions relative to the support system;
a plurality of target systems associated with the supports comprising the support system, wherein each target system in the plurality of target systems comprises at least three sensors, and wherein the plurality of target systems is configured to receive the signals and generate position information to form the metrology data; and
a controller that receives the metrology data, determines whether a current configuration of the structure is within selected tolerances of a selected configuration for the structure based on the metrology data, and generates commands for moving the support system to move the structure into the selected configuration in response to a determination that the current configuration of the structure is not within the selected tolerances of the selected configuration for the structure.

10. The apparatus of claim 9, wherein each target system in the plurality of target systems comprises at least three targets configured to receive the signals, wherein the at least three targets have a known arrangement.

11. The apparatus of claim 9, wherein the controller is configured to determine whether the current configuration of the structure is within the selected tolerances of the selected configuration for the structure based on the metrology data by:
identifying a plurality of positions for a plurality of control points using the metrology data, wherein each of the plurality of control points is selected from one of a point on a support in the support system and a connection point between the structure and the support.

12. The apparatus of claim 9, wherein the controller is configured to determine whether the current configuration of the structure is within the selected tolerances of the selected configuration for the structure based on the metrology data by:
identifying a plurality of local coordinate systems for a plurality of supports of the support system using the metrology data.

13. The apparatus of claim 12, wherein the controller is configured to determine whether the current configuration of the structure is within the selected tolerances of the selected configuration for the structure based on the metrology data by:
identifying a structure coordinate system for the structure using the plurality of local coordinate systems.

14. The apparatus of claim 13, wherein the controller is configured to determine whether the current configuration of the structure is within the selected tolerances of the selected configuration for the structure based on the metrology data by:
comparing the structure coordinate system to a global coordinate system.

15. The apparatus of claim 14, wherein the controller is configured to determine whether the current configuration of the structure is within the selected tolerances of the selected configuration for the structure based on the metrology data by:
determining whether a plane of the structure coordinate system is parallel to a plane of the global coordinate system.

16. The apparatus of claim 15, wherein the commands for moving the support system are configured to move a supporting member connected to the structure to align the structure coordinate system with the global coordinate system such that the plane of the structure coordinate system is substantially parallel to the plane of the global coordinate system.

17. A method of maintaining a selected configuration for a structure, the method comprising:
generating, by a controller, metrology data by:
emitting signals from a group of transmitters positioned relative to a support system, wherein the global coordinate system is defined with respect to the group of transmitters;
receiving the signals at a target system associated with the support in the plurality of supports;
generating position information by the target system to form the metrology data;
receiving, by a controller, metrology data for a plurality of supports comprising the support system while the support system holds the structure, each of the plurality of supports comprises a supporting member connected to the structure;
identifying, by the controller, a local coordinate system for a support in the plurality of supports of the support system using the metrology data;
comparing, by the controller, the local coordinate system to a global coordinate system to determine whether a current configuration of the structure is within selected tolerances of the selected configuration for the structure; and
moving the supporting member of the support connected to the structure, by the controller, to move the structure held by the support system into the selected configuration in response to a determination that the current configuration of the structure is not within the selected tolerances of the selected configuration for the structure.

* * * * *